United States Patent
Asai et al.

(10) Patent No.: US 12,272,837 B2
(45) Date of Patent: Apr. 8, 2025

(54) SLURRY COMPOSITION FOR NON-AQUEOUS SECONDARY BATTERY FUNCTIONAL LAYER, SEPARATOR FOR NON-AQUEOUS SECONDARY BATTERY, AND NON-AQUEOUS SECONDARY BATTERY

(71) Applicant: ZEON CORPORATION, Tokyo (JP)

(72) Inventors: Kazuki Asai, Tokyo (JP); Keiichiro Tanaka, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 728 days.

(21) Appl. No.: 17/310,671

(22) PCT Filed: Feb. 3, 2020

(86) PCT No.: PCT/JP2020/003946
§ 371 (c)(1),
(2) Date: Aug. 17, 2021

(87) PCT Pub. No.: WO2020/175025
PCT Pub. Date: Sep. 3, 2020

(65) Prior Publication Data
US 2022/0140437 A1    May 5, 2022

(30) Foreign Application Priority Data

Feb. 26, 2019    (JP) .................................. 2019-033225

(51) Int. Cl.
*H01M 50/449*    (2021.01)
*C08L 25/04*    (2006.01)
(Continued)

(52) U.S. Cl.
CPC ........... *H01M 50/449* (2021.01); *C08L 25/04* (2013.01); *H01M 10/0525* (2013.01);
(Continued)

(58) Field of Classification Search
CPC .. C08L 2207/53; C08L 25/04; H01M 50/489; H01M 50/449; H01M 10/0525
(Continued)

(56) References Cited

U.S. PATENT DOCUMENTS 10,141,557 B2    11/2018    Sasaki et al.
11,177,534 B2    11/2021    Asai
(Continued)

FOREIGN PATENT DOCUMENTS

EP    3176855 A1    6/2017
EP    3273506 A1    1/2018
(Continued)

OTHER PUBLICATIONS

Aug. 25, 2021, International Preliminary Report on Patentability issued in the International Patent Application No. PCT/JP2020/003946.
(Continued)

*Primary Examiner* — Maria Laios
*Assistant Examiner* — Zackary Richard Cochenour
(74) *Attorney, Agent, or Firm* — KENJA IP LAW PC

(57) ABSTRACT

Provided is a slurry composition for a non-aqueous secondary battery functional layer with which it is possible to form a functional layer that has excellent adhesiveness after immersion in electrolyte solution and can cause a secondary battery to display excellent rate characteristics and cycle characteristics while, on the other hand, reducing the amount of gas remaining inside the secondary battery. The slurry composition contains a particulate polymer and a solvent. The particulate polymer has a core-shell structure including a core portion and a shell portion at least partially covering an outer surface of the core portion. The particulate polymer
(Continued)

has a glass-transition temperature of 20° C. or higher and has a surface acid content of not less than 0.05 mmol/g and not more than 0.50 mmol/g.

9 Claims, 2 Drawing Sheets

(51) Int. Cl.
  *H01M 10/0525* (2010.01)
  *H01M 10/0568* (2010.01)
  *H01M 10/0569* (2010.01)
  *H01M 50/414* (2021.01)
  *H01M 50/443* (2021.01)
  *H01M 50/409* (2021.01)
  *H01M 50/489* (2021.01)

(52) U.S. Cl.
  CPC ... *H01M 10/0568* (2013.01); *H01M 10/0569* (2013.01); *H01M 50/414* (2021.01); *H01M 50/443* (2021.01); *C08L 2207/53* (2013.01); *H01M 50/409* (2021.01); *H01M 50/489* (2021.01); *H01M 2300/004* (2013.01)

(58) Field of Classification Search
  USPC .......................................................... 429/144
  See application file for complete search history.

(56) References Cited

U.S. PATENT DOCUMENTS

| | | | |
|---|---|---|---|
| 2015/0072213 A1* | 3/2015 | Kaneda | H01M 50/414 429/144 |
| 2016/0141581 A1* | 5/2016 | Sasaki | H01M 10/0525 429/144 |
| 2018/0351149 A1 | 12/2018 | Akiike et al. | |
| 2021/0320379 A1* | 10/2021 | Kwon | H01M 50/457 |

FOREIGN PATENT DOCUMENTS

| | | |
|---|---|---|
| EP | 3734695 A1 | 11/2020 |
| EP | 3796419 A1 | 3/2021 |
| JP | 2012204303 A | 10/2012 |
| JP | 2013145763 A | 7/2013 |
| JP | 2017098203 A | 6/2017 |
| KR | 1020160030891 A | 3/2016 |
| WO | 2012043729 A1 | 4/2012 |
| WO | 2017094252 A1 | 6/2017 |
| WO | 2018180472 A1 | 10/2018 |

OTHER PUBLICATIONS

Oct. 28, 2022, the Extended European Search Report issued by the European Patent Office in the corresponding European Patent Application No. 20763498.1.
Mar. 24, 2020, International Search Report issued in the International Patent Application No. PCT/JP2020/003946.

* cited by examiner

SLURRY COMPOSITION FOR NON-AQUEOUS SECONDARY BATTERY FUNCTIONAL LAYER, SEPARATOR FOR NON-AQUEOUS SECONDARY BATTERY, AND NON-AQUEOUS SECONDARY BATTERY

TECHNICAL FIELD

The present disclosure relates to a slurry composition for a non-aqueous secondary battery functional layer, a separator for a non-aqueous secondary battery, and a non-aqueous secondary battery.

BACKGROUND

Non-aqueous secondary batteries (hereinafter, also referred to simply as "secondary batteries") such as lithium ion secondary batteries have characteristics such as compact size, light weight, high energy-density, and the ability to be repeatedly charged and discharged, and are used in a wide variety of applications.

A secondary battery generally includes battery members such as electrodes (positive electrode and negative electrode) and a separator that isolates the positive electrode and the negative electrode from each other and prevents short-circuiting between the positive and negative electrodes. A porous membrane layer for improving heat resistance and strength, an adhesive layer aimed at improving adhesiveness between battery members, or the like (hereinafter, such layers may be referred to by the general term "functional layer") may be provided at the surface of an electrode and/or a separator. Specifically, electrodes that further include a functional layer formed on an electrode substrate in which an electrode mixed material layer is provided on a current collector and separators that include a functional layer formed on a separator substrate have been used as battery members.

As one example, Patent Literature (PTL) 1 describes the formation of an adhesive layer using a composition in the form of a slurry (slurry composition) that contains a binder and a particulate polymer including a (meth)acrylonitrile monomer unit and a cross-linkable monomer unit in specific proportions. According to PTL 1, the particulate polymer preferably has a core-shell structure including a core portion that is formed of a polymer having excellent ion conductivity and a shell portion that is formed of a polymer having excellent adhesiveness in electrolyte solution from a viewpoint of effectively enhancing both adhesiveness of the particulate polymer in electrolyte solution and low-temperature output characteristics (rate characteristics) of a secondary battery.

CITATION LIST

Patent Literature

PTL 1: WO2017/094252A1

SUMMARY

Technical Problem

In production of a secondary battery, an assembled secondary battery is normally subjected to treatment (aging treatment) in which the secondary battery is stored at a specific temperature for a specific time after being charged. During this aging treatment, gas (for example, carbon monoxide, carbon dioxide, hydrogen, or oxygen) may be produced through the decomposition of electrolyte solution and water, but it is desirable that as little of this gas as possible remains inside the secondary battery. For this reason, an operation (degassing operation) in which the battery container of a secondary battery is partially unsealed after aging treatment has been performed in order to expel gas that has been produced during aging treatment to the outside of the secondary battery.

However, when a functional layer has been formed using a slurry composition containing a particulate polymer having a core-shell structure according to the conventional technique described above, there have been instances in which a large amount of gas such as described above has remained inside a secondary battery including a battery member that includes this functional layer even after a degassing operation. In other words, in the conventional technique described above, there is demand not only for causing a functional layer to display excellent adhesiveness after immersion in electrolyte solution and ensuring adequate battery characteristics (particularly rate characteristics and cycle characteristics) required of a secondary battery, but also for reducing the amount of gas remaining inside the secondary battery.

Accordingly, one object of the present disclosure is to provide a slurry composition for a non-aqueous secondary battery functional layer with which it is possible to form a functional layer that has excellent adhesiveness after immersion in electrolyte solution and can cause a secondary battery to display excellent rate characteristics and cycle characteristics while, on the other hand, reducing the amount of gas remaining inside the secondary battery.

Another object of the present disclosure is to provide a separator for a non-aqueous secondary battery that can adhere well to an adjacent battery member after immersion in electrolyte solution and can cause a secondary battery to display excellent rate characteristics and cycle characteristics while, on the other hand, reducing the amount of gas remaining inside the secondary battery.

Yet another object of the present disclosure is to provide a non-aqueous secondary battery that has excellent rate characteristics and cycle characteristics and has less gas remaining inside thereof.

Solution to Problem

The inventors conducted diligent studies with the aim of solving the problems set forth above, and decided to focus on the properties of a particulate polymer having a core-shell structure that is used in formation of a functional layer. The inventors discovered that when the particulate polymer having a core-shell structure has a glass-transition temperature that is not lower than a specific value and has a surface acid content that is within a specific range, a slurry composition containing the particulate polymer can be used to form a functional layer that can display excellent adhesiveness after immersion in electrolyte solution, and that this functional layer makes it possible to achieve improvement of rate characteristics and cycle characteristics of a secondary battery and reduction of the amount of gas remaining inside the secondary battery (hereinafter, also referred to as the "residual gas content"). In this manner, the inventors completed the present disclosure.

Specifically, the present disclosure aims to advantageously solve the problems set forth above, and a presently disclosed slurry composition for a non-aqueous secondary battery functional layer comprises a particulate polymer and a solvent, wherein the particulate polymer has a core-shell structure including a core portion and a shell portion at least partially covering an outer surface of the core portion, and the particulate polymer has a glass-transition temperature of 20° C. or higher and a surface acid content of not less than 0.05 mmol/g and not more than 0.50 mmol/g. A functional layer that is formed using a slurry composition containing a particulate polymer that has a core-shell structure and that also has a glass-transition temperature of not lower than the value set forth above and a surface acid content within the range set forth above in this manner can display excellent adhesiveness after immersion in electrolyte solution. Moreover, by using a battery member that includes this functional layer to produce a secondary battery, rate characteristics and cycle characteristics of the secondary battery can be improved while also reducing residual gas content of the secondary battery.

Note that the "glass-transition temperature" referred to in the present disclosure can be measured using a measurement method described in the EXAMPLES section of the present specification.

Moreover, the "surface acid content" referred to in the present disclosure is the amount of acid present at a surface part of a polymer and indicates the acid content per 1 g of solid content of the polymer. The surface acid content can be measured using a measurement method described in the EXAMPLES section of the present specification.

In the presently disclosed slurry composition for a non-aqueous secondary battery functional layer, the particulate polymer preferably has a degree of swelling of not less than a factor of 1.0 and not more than a factor of 4.0, by mass, when immersed in an electrolyte solution for measurement for 72 hours, and a degree of swelling of not less than a factor of 8.0 and not more than a factor of 20, by mass, when immersed in the electrolyte solution for measurement for 240 hours. The electrolyte solution for measurement is a solution obtained by dissolving $LiPF_6$ with a concentration of 1 mol/L in a mixed solvent obtained by mixing ethylene carbonate, diethyl carbonate, and vinylene carbonate in a volume ratio of ethylene carbonate/diethyl carbonate/vinylene carbonate=68.5/30/1.5. When the degree of swelling after immersion in the specific electrolyte solution for measurement set forth above for 72 hours (hereinafter, also referred to as the "72-hour degree of swelling in electrolyte solution") and the degree of swelling after immersion in the electrolyte solution for measurement for 240 hours (hereinafter, also referred to as the "240-hour degree of swelling in electrolyte solution") have values that are within the ranges set forth above, adhesiveness of a functional layer after immersion in electrolyte solution and rate characteristics and cycle characteristics of a secondary battery can be further improved while also further reducing residual gas content of the secondary battery. In addition, storage characteristics of the secondary battery can be improved.

Note that the "degree of swelling" referred to in the present disclosure is the degree of swelling (by mass) after immersion in the specific electrolyte solution for measurement set forth above for a specific time and can, more specifically, be measured using a measurement method described in the EXAMPLES section of the present specification.

In the presently disclosed slurry composition for a non-aqueous secondary battery functional layer, the core portion is preferably formed of a polymer including an aromatic monovinyl monomer unit in a proportion of not less than 30 mass % and less than 85 mass %, and the shell portion is preferably formed of a polymer including an aromatic monovinyl monomer unit in a proportion of not less than 85 mass % and not more than 100 mass %. When the proportions in which an aromatic monovinyl monomer unit is included in the polymer of the core portion and the polymer of the shell portion are within the ranges set forth above, sticking together of battery members can be inhibited when, for example, a battery member including a functional layer is stored and transported in a wound up state (i.e., blocking resistance can be increased), and adhesiveness of the functional layer after immersion in electrolyte solution can be further improved.

The phrase "includes a monomer unit" as used in the present disclosure means that "a polymer obtained with the monomer includes a repeating unit derived from the monomer". The "proportional content (mass %)" of each type of monomer unit (each type of repeating unit) included in a polymer can be measured by a nuclear magnetic resonance (NMR) method such as $^1$H-NMR or $^{13}$C-NMR.

The presently disclosed slurry composition for a non-aqueous secondary battery functional layer preferably further comprises a binder for a functional layer, wherein the binder for a functional layer has a glass-transition temperature of lower than 20° C. When the slurry composition further contains a binder for a functional layer that is formed of a polymer having a glass-transition temperature of lower than the value set forth above, adhesiveness of a functional layer after immersion in electrolyte solution can be further improved while also further enhancing rate characteristics of a secondary battery.

In the presently disclosed slurry composition for a non-aqueous secondary battery functional layer, the binder for a functional layer is preferably formed of a polymer including an aromatic monovinyl monomer unit. By using a polymer that includes an aromatic monovinyl monomer unit as the binder for a functional layer, adhesiveness of a functional layer after immersion in electrolyte solution and rate characteristics and cycle characteristics of a secondary battery can be improved in a good balance.

Moreover, the present disclosure aims to advantageously solve the problems set forth above, and a presently disclosed separator for a non-aqueous secondary battery comprises: a separator substrate; and a functional layer formed using any one of the slurry compositions for a non-aqueous secondary battery functional layer set forth above. A separator that includes a separator substrate and a functional layer formed from any one of the slurry compositions set forth above in this manner can adhere well to an adjacent battery member (for example, an electrode) through the functional layer after immersion in electrolyte solution. Moreover, by using this battery member to produce a secondary battery, rate characteristics and cycle characteristics of the secondary battery can be improved while also reducing residual gas content of the secondary battery.

In the presently disclosed separator for a non-aqueous secondary battery, a separator substrate including a porous membrane layer containing non-conductive particles and a binder may be used as the separator substrate.

Furthermore, the present disclosure aims to advantageously solve the problems set forth above, and a presently disclosed non-aqueous secondary battery comprises a positive electrode, a negative electrode, a separator, and an electrolyte solution, wherein the separator is any one of the separators for a non-aqueous secondary battery set forth above. A secondary battery that includes any one of the separators set forth above in this manner has excellent rate characteristics and cycle characteristics and low residual gas content.

Advantageous Effect

According to the present disclosure, it is possible to provide a slurry composition for a non-aqueous secondary battery functional layer with which it is possible to form a functional layer that has excellent adhesiveness after immersion in electrolyte solution and can cause a secondary battery to display excellent rate characteristics and cycle characteristics while, on the other hand, reducing the amount of gas remaining inside the secondary battery.

Moreover, according to the present disclosure, it is possible provide a separator for a non-aqueous secondary battery that can adhere well to an adjacent battery member after immersion in electrolyte solution and can cause a secondary battery to display excellent rate characteristics and cycle characteristics while, on the other hand, reducing the amount of gas remaining inside the secondary battery.

Furthermore, according to the present disclosure, it is possible to provide a non-aqueous secondary battery that has excellent rate characteristics and cycle characteristics and has less gas remaining inside thereof.

DETAILED DESCRIPTION

Figure 1:
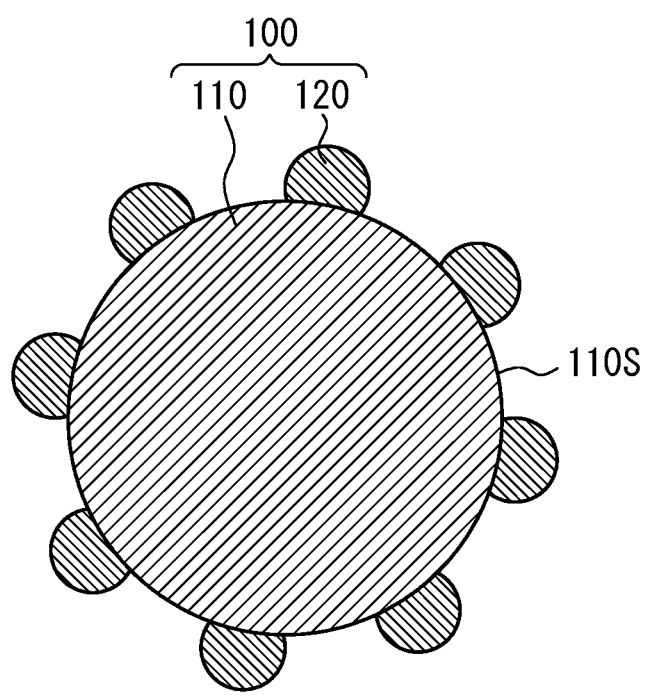
FIG. 1 is a cross-sectional view schematically illustrating the structure of one example of a particulate polymer contained in a slurry composition for a non-aqueous secondary battery functional layer.

The following provides a detailed description of embodiments of the present disclosure.

The presently disclosed slurry composition for a non-aqueous secondary battery functional layer is used as a material in production of a functional layer included in a battery member such as a separator or an electrode. Moreover, the presently disclosed separator for a non-aqueous secondary battery includes a functional layer formed using the presently disclosed slurry composition for a non-aqueous secondary battery functional layer. Furthermore, the presently disclosed non-aqueous secondary battery includes the presently disclosed separator for a non-aqueous secondary battery.

(Slurry Composition for Non-Aqueous Secondary Battery Functional Layer)

The presently disclosed slurry composition for a non-aqueous secondary battery functional layer contains a particulate polymer and a solvent, and can optionally further contain a binder for a functional layer and other components.

Features of the particulate polymer contained in the presently disclosed slurry composition are that the particulate polymer has a core-shell structure, a glass-transition temperature of 20° C. or higher, and a surface acid content of not less than 0.05 mmol/g and not more than 0.50 mmol/g.

As a result of the presently disclosed slurry composition containing a particulate polymer that has a core-shell structure, a glass-transition temperature of 20° C. or higher, and a surface acid content of not less than 0.05 mmol/g and not more than 0.50 mmol/g, a functional layer that is formed from the slurry composition has excellent adhesiveness after immersion in electrolyte solution, can cause a secondary battery to display excellent rate characteristics and cycle characteristics, and can reduce the amount of gas remaining inside the secondary battery.

<Particulate Polymer>

The particulate polymer has a core-shell structure, a glass-transition temperature of 20° C. or higher, and a surface acid content of not less than 0.05 mmol/g and not more than 0.50 mmol/g as previously described.

Note that the particulate polymer is preferably water-insoluble. When a polymer is said to be "water-insoluble" in the present disclosure, this means that when 0.5 g of the polymer is dissolved in 100 g of water at a temperature of 25° C., insoluble content is 90 mass % or more.

<<Core-Shell Structure>>

The particulate polymer has a core-shell structure including a core portion and a shell portion covering an outer surface of the core portion. By using a particulate polymer that has a core-shell structure, adhesiveness of a functional layer after immersion in electrolyte solution can be improved, and blocking resistance of a battery member that includes the functional layer can be ensured.

The shell portion may completely cover the outer surface of the core portion or may partially cover the outer surface of the core portion. In terms of external appearance, even in a situation in which the outer surface of the core portion appears to be completely covered by the shell portion, the shell portion is still considered to be a shell portion that partially covers the outer surface of the core portion so long as pores are formed that pass between inside and outside of the shell portion. Accordingly, a particulate polymer that includes a shell portion having fine pores that pass between an outer surface of the shell portion (i.e., a circumferential surface of the particulate polymer) and an outer surface of a core portion, for example, also corresponds to a particulate polymer in which a shell portion partially covers an outer surface of a core portion.

FIG. 1 illustrates one example of cross-sectional structure of the particulate polymer in a case in which the shell portion partially covers the outer surface of the core portion. A particulate polymer 100 illustrated in FIG. 1 has a core-shell structure including a core portion 110 and a shell portion 120. The core portion 110 is a portion that is further inward than the shell portion 120 in the particulate polymer 100. The shell portion 120 is a portion that covers an outer surface 110S of the core portion 110 and is normally an outermost portion in the particulate polymer 100. The shell portion 120 partially covers the outer surface 110S of the core portion 110, but does not completely cover the outer surface 110S of the core portion 110.

Note that the particulate polymer may include any constituent element other than the core portion and the shell portion described above so long as the expected effects are not significantly lost as a result. Specifically, the particulate polymer may, for example, include a portion inside of the core portion that is formed of a different polymer to the core portion. In one specific example, a residual seed particle may be present inside of the core portion in a situation in which seed particles are used in production of the particulate polymer by seeded polymerization. However, from a viewpoint of more noticeably displaying the expected effects, it is preferable that the particulate polymer is composed of only the core portion and the shell portion.

<<Glass-Transition Temperature>>

The glass-transition temperature of the particulate polymer is required to be 20° C. or higher, is preferably 30° C. or higher, more preferably 40° C. or higher, and even more preferably 54° C. or higher, and is preferably 150° C. or lower, more preferably 130° C. or lower, and even more preferably 100° C. or lower. When the glass-transition temperature of the particulate polymer is lower than 20° C., the internal resistance of a secondary battery increases, and rate characteristics of the secondary battery cannot be ensured. This is presumed to be due to heat easily causing melting of the particulate polymer to form a film inside the secondary battery. In addition, blocking resistance of a battery member that includes a functional layer decreases. On the other hand, when the glass-transition temperature of the particulate polymer is 150° C. or lower, sufficient deformability of the particulate polymer during pressing in production of a secondary battery, for example, is ensured, and thus adhesiveness of a functional layer after immersion in electrolyte solution can be further improved.

Note that the glass-transition temperature of the particulate polymer can be adjusted by altering the types and proportions of monomers used to produce the particulate polymer, for example. More specifically, the glass-transition temperature of the particulate polymer can be raised by increasing the proportion in which an aromatic monovinyl monomer is used in production of the particulate polymer.

<<Surface Acid Content>>

The surface acid content of the particulate polymer is required to be not less than 0.05 mmol/g and not more than 0.50 mmol/g, is preferably 0.08 mmol/g or more, more preferably 0.10 mmol/g or more, and even more preferably 0.15 mmol/g or more, and is preferably 0.40 mmol/g or less, and more preferably 0.30 mmol/g or less. When the surface acid content of the particulate polymer is 0.05 mmol/g or more, it is presumed that as a result of the polarity of the particulate polymer surface increasing and interactions between the particulate polymer and low-polarity gas produced during aging treatment decreasing, such gas has a low tendency to remain in a gap between a separator and an electrode (for example, in a functional layer). This makes it possible to reduce the residual gas content of a secondary battery through a degassing operation. In other words, the residual gas content of a secondary battery cannot be sufficiently reduced when the surface acid content of the particulate polymer is less than 0.05 mmol/g. On the other hand, when the surface acid content of the particulate polymer is more than 0.50 mmol/g, deterioration of cycle characteristics of a secondary battery is presumed to occur due to an increase in the amount of water that is imported into the secondary battery through the particulate polymer.

Note that the surface acid content of the particulate polymer can be adjusted by altering the types and proportions of monomers used to produce the particulate polymer, for example. More specifically, the surface acid content of the particulate polymer can be increased by increasing the proportion in which an acidic group-containing monomer is used in production of the particulate polymer and by using a monomer having a plurality of acidic groups, such as itaconic acid, as the acidic group-containing monomer. The surface acid content of the particulate polymer can also be increased by increasing the proportion in which a nitrile group-containing monomer is used in production of the particulate polymer (particularly a polymer of the shell portion).

<<Degree of Swelling in Electrolyte Solution>>

The degree of swelling of the particulate polymer when immersed in a specific electrolyte solution for measurement for 72 hours is preferably a factor of 1.0 or more, more preferably a factor of 1.5 or more, even more preferably a factor of 2.0 or more, and particularly preferably a factor of 2.4 or more, and is preferably a factor of 4.0 or less, more preferably a factor of 3.5 or less, and even more preferably a factor of 3.0 or less. When the 72-hour degree of swelling in electrolyte solution of the particulate polymer is a factor of 1.0 or more, sufficient affinity with electrolyte solution is ensured, and rate characteristics of a secondary battery can be further improved. On the other hand, when the 72-hour degree of swelling in electrolyte solution of the particulate polymer is a factor of 4.0 or less, the particulate polymer does not elute into electrolyte solution and excessively lose its particulate form, and adhesiveness of a functional layer after immersion in electrolyte solution can be further improved while also further reducing residual gas content of a secondary battery.

The degree of swelling of the particulate polymer when immersed in the specific electrolyte solution for measurement for 240 hours is preferably a factor of 8.0 or more, and more preferably a factor of 10 or more, and is preferably a factor of 20 or less, more preferably a factor of 18 or less, and even more preferably a factor of 15 or less. When the 240-hour degree of swelling in electrolyte solution of the particulate polymer is a factor of 8.0 or more, electrolyte solution retention of the particulate polymer increases, and storage characteristics of a secondary battery can be improved. On the other hand, when the 240-hour degree of swelling in electrolyte solution is a factor of 20 or less, formation of a film due to excessive swelling of the particulate polymer is inhibited, and cycle characteristics of a secondary battery can be further improved.

Note that the degree of swelling in electrolyte solution of the particulate polymer can be adjusted by altering the types and proportions of monomers used to produce the particulate polymer, for example. More specifically, the degree of swelling in electrolyte solution of the particulate polymer can be reduced by increasing the proportion in which a cross-linkable monomer is used in production of the particulate polymer. The degree of swelling in electrolyte solution of the particulate polymer can also be reduced by using a monomer having a solubility parameter differing (to a comparatively large degree) from that of the electrolyte solution.

<<Volume-Average Particle Diameter>>

The volume-average particle diameter of the particulate polymer is preferably 0.10 μm or more, more preferably 0.45 μm or more, even more preferably 0.60 μm or more, and particularly preferably 0.70 μm or more, and is preferably 10 μm or less, more preferably 3.0 μm or less, and even more preferably 2.0 μm or less. When the volume-average particle diameter of the particulate polymer is 0.10 μm or more, it is presumed that as a result of minute gaps easily being ensured in a functional layer, the residual gas content of a secondary battery can be further reduced. On the other hand, when the volume-average particle diameter of the particulate polymer is 10 μm or less, adhesiveness of a functional layer after immersion in electrolyte solution can be further improved.

Note that the "volume-average particle diameter" referred to in the present disclosure can be measured using a method described in the EXAMPLES section of the present specification. The volume-average particle diameter of the particulate polymer can be adjusted by, for example, altering the types and proportions of monomers used to produce the particulate polymer and/or altering the polymerization conditions (for example, the used amount of emulsifier) of the particulate polymer.

<<Chemical Composition>>

So long as the particulate polymer has the core-shell structure set forth above and has a glass-transition temperature and surface acid content as set forth above, no specific limitations are placed on the chemical compositions of the core portion and the shell portion. The following describes the chemical compositions of a polymer forming the core portion and a polymer forming the shell portion through examples.

[Core Portion]

Preferable examples of repeating units included in the polymer forming the core portion include, but are not specifically limited to, an aromatic monovinyl monomer unit, an acidic group-containing monomer unit, and a cross-linkable monomer unit. The polymer of the core portion may include only one type of monomer unit (repeating unit) or may include a plurality of types of monomer units (repeating units).

—Aromatic Monovinyl Monomer Unit—

Examples of aromatic monovinyl monomers that can form an aromatic monovinyl monomer unit in the polymer of the core portion include styrene, styrene sulfonic acid and salts thereof (for example, sodium styrenesulfonate), α-methylstyrene, vinyltoluene, and 4-(tert-butoxy)styrene. One of these aromatic monovinyl monomers may be used individually, or a plurality of these aromatic monovinyl monomers may be used in combination. Of these aromatic monovinyl monomers, styrene is preferable.

The proportion constituted by an aromatic monovinyl monomer unit included in the polymer of the core portion when all repeating units included in the polymer of the core portion are taken to be 100 mass % is preferably 30 mass % or more, and more preferably 40 mass % or more, and is preferably less than 85 mass %, and more preferably 75 mass % or less. When the proportion in the polymer of the core portion constituted by an aromatic monovinyl monomer unit is 30 mass % or more, the glass-transition temperature of the polymer of the core portion rises, and blocking resistance of a battery member that includes a functional layer can be improved. On the other hand, when the proportion in the polymer of the core portion constituted by an aromatic monovinyl monomer unit is less than 85 mass %, sufficient deformability of the particulate polymer during pressing in production of a secondary battery, for example, is ensured, and thus adhesiveness of a functional layer after immersion in electrolyte solution can be further improved.

Moreover, the proportion constituted by an aromatic monovinyl monomer unit included in the polymer of the core portion when all repeating units included in the particulate polymer (i.e., the total of the polymer of the core portion and the polymer of the shell portion) are taken to be 100 mass % is preferably 20 mass % or more, more preferably 25 mass % or more, and even more preferably 30 mass % or more, and is preferably 60 mass % or less, more preferably 50 mass % or less, and even more preferably 40 mass % or less. When the proportion in the particulate polymer constituted by an aromatic monovinyl monomer unit of the core portion is 20 mass % or more, blocking resistance of a battery member that includes a functional layer can be improved. On the other hand, when the proportion in the particulate polymer constituted by an aromatic monovinyl monomer unit of the core portion is 60 mass % or less, sufficient deformability of the particulate polymer during pressing in production of a secondary battery, for example, is ensured, and thus adhesiveness of a functional layer after immersion in electrolyte solution can be further improved.

—Acidic Group-Containing Monomer Unit—

Examples of acidic group-containing monomers that can form an acidic group-containing monomer unit in the polymer of the core portion include carboxy group-containing monomers, sulfo group-containing monomers, and phosphate group-containing monomers. One of these acidic group-containing monomers may be used individually, or a plurality of these acidic group-containing monomers may be used in combination.

Examples of carboxy group-containing monomers that can be used include ethylenically unsaturated monocarboxylic acids, derivatives of ethylenically unsaturated monocarboxylic acids, ethylenically unsaturated dicarboxylic acids, acid anhydrides of ethylenically unsaturated dicarboxylic acids, and derivatives of ethylenically unsaturated dicarboxylic acids and acid anhydrides thereof.

Examples of ethylenically unsaturated monocarboxylic acids include acrylic acid, methacrylic acid, and crotonic acid. Examples of derivatives of ethylenically unsaturated monocarboxylic acids include 2-ethylacrylic acid, isocrotonic acid, α-acetoxyacrylic acid, β-trans-aryloxyacrylic acid, α-chloro-β-E-methoxyacrylic acid, and β-diaminoacrylic acid.

Examples of ethylenically unsaturated dicarboxylic acids include maleic acid, fumaric acid, itaconic acid, and mesaconic acid. Examples of acid anhydrides of ethylenically unsaturated dicarboxylic acids include maleic anhydride, acrylic anhydride, methylmaleic anhydride, and dimethylmaleic anhydride. Examples of derivatives of ethylenically unsaturated dicarboxylic acids include methylmaleic acid, dimethylmaleic acid, phenylmaleic acid, chloromaleic acid, dichloromaleic acid, fluoromaleic acid, diphenyl maleate, nonyl maleate, decyl maleate, dodecyl maleate, octadecyl maleate, and fluoroalkyl maleates.

Examples of sulfo group-containing monomers include vinyl sulfonic acid, methyl vinyl sulfonic acid, (meth)allyl sulfonic acid, (meth)acrylic acid 2-sulfoethyl, 2-acrylamido-2-methylpropane sulfonic acid, and 3-allyloxy-2-hydroxypropane sulfonic acid.

Note that in the present disclosure, "(meth)allyl" is used to indicate "allyl" and/or "methallyl", whereas "(meth) acryl" is used to indicate "acryl" and/or "methacryl".

Examples of phosphate group-containing monomers include 2-(meth)acryloyloxyethyl phosphate, methyl-2-(meth)acryloyloxyethyl phosphate, and ethyl-(meth)acryloyloxyethyl phosphate.

In the present disclosure, "(meth)acryloyl" is used to indicate "acryloyl" and/or "methacryloyl".

Of these acidic group-containing monomers, carboxy group-containing monomers are preferable, acrylic acid, methacrylic acid, and itaconic acid are more preferable, and methacrylic acid is even more preferable.

The proportion constituted by an acidic group-containing monomer unit included in the polymer of the core portion when all repeating units included in the polymer of the core portion are taken to be 100 mass % is preferably 1.0 mass % or more, and more preferably 1.5 mass % or more, and is preferably 7.0 mass % or less, more preferably 6.0 mass % or less, and even more preferably 5.0 mass % or less. When the proportion constituted in the polymer of the core portion by an acidic group-containing monomer unit is 1.0 mass % or more, the polarity of the particulate polymer surface can be further increased, and residual gas content of a secondary battery can be further reduced. On the other hand, when the proportion in the polymer of the core portion constituted by an acidic group-containing monomer unit is 7.0 mass % or less, the amount of water that is imported into a secondary battery through the particulate polymer can be reduced, and cycle characteristics of the secondary battery can be further improved.

Moreover, the proportion constituted by an acidic group-containing monomer unit included in the polymer of the core portion when all repeating units included in the particulate polymer (i.e., the total of the polymer of the core portion and the polymer of the shell portion) are taken to be 100 mass % is preferably 0.5 mass % or more, more preferably 1.0 mass % or more, and even more preferably 1.5 mass % or more, and is preferably 5.0 mass % or less, more preferably 4.0 mass % or less, and even more preferably 3.0 mass % or less. When the proportion in the particulate polymer constituted by an acidic group-containing monomer unit of the core portion is 0.5 mass % or more, the polarity of the particulate polymer surface can be further increased, and residual gas content of a secondary battery can be further reduced. On the other hand, when the proportion in the particulate polymer constituted by an acidic group-containing monomer unit of the core portion is 5.0 mass % or less, the amount of water that is imported into a secondary battery through the particulate polymer can be reduced, and cycle characteristics of the secondary battery can be further improved.

—Cross-Linkable Monomer Unit—

Examples of cross-linkable monomers that can form a cross-linkable monomer unit in the polymer of the core portion include, but are not specifically limited to, monomers that can form a cross-linked structure through polymerization. Examples of cross-linkable monomers that can be used typically include monomers that are thermally cross-linkable. More specific examples include cross-linkable monomers including a thermally cross-linkable group and one olefinic double bond per molecule; and cross-linkable monomers including two or more olefinic double bonds per molecule.

Examples of thermally cross-linkable groups include an epoxy group, an N-methylolamide group, an oxetanyl group, an oxazoline group, and combinations thereof. Of these thermally cross-linkable groups, an epoxy group is more preferable in terms of ease of cross-linking and cross-link density adjustment.

Examples of cross-linkable monomers that include an epoxy group as a thermally cross-linkable group and also include an olefinic double bond include unsaturated glycidyl ethers such as vinyl glycidyl ether, allyl glycidyl ether, butenyl glycidyl ether, and o-allylphenyl glycidyl ether; monoepoxides of dienes and polyenes such as butadiene monoepoxide, chloroprene monoepoxide, 4,5-epoxy-2-pentene, 3,4-epoxy-1-vinylcyclohexene, and 1,2-epoxy-5,9-cyclododecadiene; alkenyl epoxides such as 3,4-epoxy-1-butene, 1,2-epoxy-5-hexene, and 1,2-epoxy-9-decene; and glycidyl esters of unsaturated carboxylic acids such as glycidyl acrylate, glycidyl methacrylate, glycidyl crotonate, glycidyl-4-heptenoate, glycidyl sorbate, glycidyl linoleate, glycidyl-4-methyl-3-pentenoate, glycidyl ester of 3-cyclohexenecarboxylic acid, and glycidyl ester of 4-methyl-3-cyclohexenecarboxylic acid.

Examples of cross-linkable monomers that include an N-methylolamide group as a thermally cross-linkable group and also include an olefinic double bond include methylol group-containing (meth)acrylamides such as N-methylol (meth)acrylamide.

Examples of cross-linkable monomers that include an oxetanyl group as a thermally cross-linkable group and also include an olefinic double bond include 3-((meth)acryloyloxymethyl)oxetane, 3-((meth)acryloyloxymethyl)-2-trifluoromethyloxetane, 3-((meth)acryloyloxymethyl)-2-phenyloxetane, 2-((meth)acryloyloxymethyl)oxetane, and 2-((meth)acryloyloxymethyl)-4-trifluoromethyloxetane.

Examples of cross-linkable monomers that include an oxazoline group as a thermally cross-linkable group and also include an olefinic double bond include 2-vinyl-2-oxazoline, 2-vinyl-4-methyl-2-oxazoline, 2-vinyl-5-methyl-2-oxazoline, 2-isopropenyl-2-oxazoline, 2-isopropenyl-4-methyl-2-oxazoline, 2-isopropenyl-5-methyl-2-oxazoline, and 2-isopropenyl-5-ethyl-2-oxazoline.

Examples of cross-linkable monomers that include two or more olefinic double bonds per molecule include allyl (meth)acrylate, ethylene glycol di(meth)acrylate, diethylene glycol di(meth)acrylate, triethylene glycol di(meth)acrylate, tetraethylene glycol di(meth)acrylate, trimethylolpropane tri(meth)acrylate, dipropylene glycol diallyl ether, polyglycol diallyl ether, triethylene glycol divinyl ether, hydroquinone diallyl ether, tetraallyloxyethane, trimethylolpropane diallyl ether, allyl or vinyl ethers of polyfunctional alcohols other than the preceding examples, triallylamine, methylenebisacrylamide, and divinylbenzene.

Note that in the present disclosure, "(meth)acrylate" is used to indicate "acrylate" and/or "methacrylate".

One cross-linkable monomer may be used individually, or a plurality of cross-linkable monomers may be used in combination. Of these cross-linkable monomers, cross-linkable monomers including two or more olefinic double bonds per molecule are preferable, ethylene glycol dimethacrylate and allyl methacrylate are more preferable, and ethylene glycol dimethacrylate is even more preferable.

The proportion constituted by a cross-linkable monomer unit included in the polymer of the core portion when all repeating units included in the polymer of the core portion are taken to be 100 mass % is preferably 0.05 mass % or more, and more preferably 0.1 mass % or more, and is preferably 5.0 mass % or less, more preferably 4.0 mass % or less, and even more preferably 2.0 mass % or less. When the proportion in the polymer of the core portion constituted by a cross-linkable monomer unit is within any of the ranges set forth above, the 72-hour degree of swelling in electrolyte solution and 240-hour degree of swelling in electrolyte solution of the particulate polymer can be controlled well, and adhesiveness of a functional layer after immersion in electrolyte solution and rate characteristics and cycle characteristics of a secondary battery can be further improved. In addition, the residual gas content of the secondary battery can be further reduced, and storage characteristics of the secondary battery can be enhanced.

Moreover, the proportion constituted by a cross-linkable monomer unit included in the polymer of the core portion when all repeating units included in the particulate polymer (i.e., the total of the polymer of the core portion and the polymer of the shell portion) are taken to be 100 mass % is preferably 0.01 mass % or more, and more preferably 0.05 mass % or more, and is preferably 4.0 mass % or less, more preferably 2.0 mass % or less, and even more preferably 1.0 mass % or less. When the proportion in the particulate polymer constituted by a cross-linkable monomer unit of the core portion is within any of the ranges set forth above, the 72-hour degree of swelling in electrolyte solution and 240-hour degree of swelling in electrolyte solution of the particulate polymer can be controlled well, and adhesiveness of a functional layer after immersion in electrolyte solution and rate characteristics and cycle characteristics of a secondary battery can be further improved. In addition, the residual gas content of the secondary battery can be further reduced, and storage characteristics of the secondary battery can be enhanced.

—Other Monomer Units—

Examples of monomer units other than an aromatic monovinyl monomer unit, an acidic group-containing monomer unit, and a cross-linkable monomer unit (i.e., other monomer units) that can be included in the polymer forming the core portion include, but are not specifically limited to, a (meth) acrylic acid ester monomer unit and a nitrile group-containing monomer unit.

Examples of (meth)acrylic acid ester monomers that can form a (meth)acrylic acid ester monomer unit in the polymer of the core portion include acrylic acid alkyl esters such as methyl acrylate, ethyl acrylate, n-propyl acrylate, isopropyl acrylate, n-butyl acrylate, t-butyl acrylate, isobutyl acrylate, n-pentyl acrylate, isopentyl acrylate, hexyl acrylate, heptyl acrylate, octyl acrylate, 2-ethylhexyl acrylate, nonyl acrylate, decyl acrylate, lauryl acrylate, n-tetradecyl acrylate, and stearyl acrylate; and methacrylic acid alkyl esters such as methyl methacrylate, ethyl methacrylate, n-propyl methacrylate, isopropyl methacrylate, n-butyl methacrylate, t-butyl methacrylate, isobutyl methacrylate, n-pentyl methacrylate, isopentyl methacrylate, hexyl methacrylate, heptyl methacrylate, octyl methacrylate, 2-ethylhexyl methacrylate, nonyl methacrylate, decyl methacrylate, lauryl methacrylate, n-tetradecyl methacrylate, stearyl methacrylate, and glycidyl methacrylate. One of these (meth)acrylic acid ester monomers may be used individually, or a plurality of these (meth)acrylic acid ester monomers may be used in combination. Of these (meth)acrylic acid ester monomers, 2-ethylhexyl acrylate, n-butyl acrylate, and ethyl acrylate are preferable, and 2-ethylhexyl acrylate is more preferable.

The proportion constituted by a (meth)acrylic acid ester monomer unit included in the polymer of the core portion when all repeating units included in the polymer of the core portion are taken to be 100 mass % is preferably 20 mass % or more, and more preferably 30 mass % or more, and is preferably 50 mass % or less, and more preferably 40 mass % or less. When the proportion in the polymer of the core portion constituted by a (meth)acrylic acid ester monomer unit is within any of the ranges set forth above, flexibility of the particulate polymer can be ensured while also controlling the 72-hour degree of swelling in electrolyte solution and 240-hour degree of swelling in electrolyte solution of the particulate polymer well. Consequently, the adhesiveness of a functional layer after immersion in electrolyte solution and the rate characteristics and cycle characteristics of a secondary battery can be further improved. In addition, the residual gas content of the secondary battery can be further reduced, and storage characteristics of the secondary battery can be enhanced.

The proportion constituted by a (meth)acrylic acid ester monomer unit included in the polymer of the core portion when all repeating units included in the particulate polymer (i.e., the total of the polymer of the core portion and the polymer of the shell portion) are taken to be 100 mass % is preferably 10 mass % or more, and more preferably 20 mass % or more, and is preferably 40 mass % or less, and more preferably 30 mass % or less. When the proportion in the particulate polymer constituted by a (meth)acrylic acid ester monomer unit of the core portion is within any of the ranges set forth above, flexibility of the particulate polymer can be ensured while also controlling the 72-hour degree of swelling in electrolyte solution and 240-hour degree of swelling in electrolyte solution of the particulate polymer well. Consequently, the adhesiveness of a functional layer after immersion in electrolyte solution and the rate characteristics and cycle characteristics of a secondary battery can be further improved. In addition, the residual gas content of the secondary battery can be further reduced, and storage characteristics of the secondary battery can be enhanced.

Examples of nitrile-group containing monomers that can form a nitrile group-containing monomer unit in the polymer of the core portion include $\alpha,\beta$-ethylenically unsaturated nitrile monomers. Specifically, any $\alpha,\beta$-ethylenically unsaturated compound that has a nitrile group can be used as an $\alpha,\beta$-ethylenically unsaturated nitrile monomer without any specific limitations. Examples include acrylonitrile; $\alpha$-halogenoacrylonitriles such as $\alpha$-chloroacrylonitrile and $\alpha$-bromoacrylonitrile; and $\alpha$-alkylacrylonitriles such as $\alpha$-methacrylonitrile and $\alpha$-ethylacrylonitrile. One of these nitrile group-containing monomers may be used individually, or a plurality of these nitrile group-containing monomers may be used in combination. Of these nitrile group-containing monomers, acrylonitrile and methacrylonitrile are preferable, and acrylonitrile is more preferable.

The proportion constituted by a nitrile group-containing monomer unit included in the polymer of the core portion when all repeating units included in the polymer of the core portion are taken to be 100 mass % is preferably 1 mass % or more, and more preferably 5 mass % or more, and is preferably 20 mass % or less, and more preferably 15 mass % or less. When the proportion in the polymer of the core portion constituted by a nitrile group-containing monomer unit is within any of the ranges set forth above, strength of the particulate polymer can be ensured while also controlling the 72-hour degree of swelling in electrolyte solution and 240-hour degree of swelling in electrolyte solution of the particulate polymer well. Consequently, the adhesiveness of a functional layer after immersion in electrolyte solution and the rate characteristics and cycle characteristics of a secondary battery can be further improved. In addition, the residual gas content of the secondary battery can be further reduced, and storage characteristics of the secondary battery can be enhanced.

The proportion constituted by a nitrile group-containing monomer unit included in the polymer of the core portion when all repeating units included in the particulate polymer (i.e., the total of the polymer of the core portion and the polymer of the shell portion) are taken to be 100 mass % is preferably 0.5 mass % or more, and more preferably 3 mass % or more, and is preferably 15 mass % or less, and more preferably 10 mass % or less. When the proportion in the particulate polymer constituted by a nitrile group-containing monomer unit of the core portion is within any of the ranges set forth above, strength of the particulate polymer can be ensured while also controlling the 72-hour degree of swelling in electrolyte solution and 240-hour degree of swelling in electrolyte solution of the particulate polymer well. Consequently, the adhesiveness of a functional layer after immersion in electrolyte solution and the rate characteristics and cycle characteristics of a secondary battery can be further improved. In addition, the residual gas content of the secondary battery can be further reduced, and storage characteristics of the secondary battery can be enhanced.

[Shell Portion]

Preferable examples of repeating units included in the polymer forming the shell portion include, but are not specifically limited to, an aromatic monovinyl monomer unit and an acidic group-containing monomer unit. The polymer of the shell portion may include only one type of monomer unit (repeating unit) or may include a plurality of types of monomer units (repeating units).

—Aromatic Monovinyl Monomer Unit—

Examples of aromatic monovinyl monomers that can form an aromatic monovinyl monomer unit in the polymer of the shell portion include the same aromatic monovinyl monomers as previously described in the "Core portion" section. One of these aromatic monovinyl monomers may be used individually, or a plurality of these aromatic monovinyl monomers may be used in combination. Of these aromatic monovinyl monomers, styrene is preferable.

The proportion constituted by an aromatic monovinyl monomer unit included in the polymer of the shell portion when all repeating units included in the polymer of the shell portion are taken to be 100 mass % is preferably 85 mass % or more, and more preferably 90 mass % or more. When the proportion in the polymer of the shell portion constituted by an aromatic monovinyl monomer unit is 85 mass % or more, the glass-transition temperature of the polymer of the shell portion rises, and blocking resistance of a battery member that includes a functional layer can be improved. Note that the upper limit for the proportion constituted by an aromatic monovinyl monomer unit included in the polymer of the shell portion is 100 mass % or less, and is preferably 99 mass % or less, and more preferably 95 mass % or less.

Moreover, the proportion constituted by an aromatic monovinyl monomer unit included in the polymer of the shell portion when all repeating units included in the particulate polymer (i.e., the total of the polymer of the core portion and the polymer of the shell portion) are taken to be 100 mass % is preferably 10 mass % or more, and more preferably 20 mass % or more. When the proportion in the particulate polymer constituted by an aromatic monovinyl monomer unit of the shell portion is 10 mass % or more, the glass-transition temperature of the polymer of the shell portion rises, and blocking resistance of a battery member that includes a functional layer can be improved. Note that the upper limit for the proportion in the particulate polymer constituted by an aromatic monovinyl monomer unit of the shell portion is preferably 40 mass % or less, and more preferably 30 mass % or less.

—Acidic Group-Containing Monomer Unit—

Examples of acidic group-containing monomers that can form an acidic group-containing monomer unit in the polymer of the shell portion include the same acidic group-containing monomers as previously described in the "Core portion" section. One of these acidic group-containing monomers may be used individually, or a plurality of these acidic group-containing monomers may be used in combination. Of these acidic group-containing monomers, carboxy group-containing monomers are preferable, acrylic acid, methacrylic acid, and itaconic acid are more preferable, and methacrylic acid is even more preferable.

The proportion constituted by an acidic group-containing monomer unit included in the polymer of the shell portion when all repeating units included in the polymer of the shell portion are taken to be 100 mass % is preferably 0.1 mass % or more, and more preferably 0.5 mass % or more, and is preferably 5.0 mass % or less, more preferably 4.0 mass % or less, and even more preferably 3.0 mass % or less. When the proportion in the polymer of the shell portion constituted by an acidic group-containing monomer unit is 0.1 mass % or more, the polarity of the particulate polymer surface can be further increased, and residual gas content of a secondary battery can be further reduced. On the other hand, when the proportion in the polymer of the shell portion constituted by an acidic group-containing monomer unit is 5.0 mass % or less, the amount of water that is imported into a secondary battery through the particulate polymer can be reduced, and cycle characteristics of the secondary battery can be further improved.

Moreover, the proportion constituted by an acidic group-containing monomer unit included the polymer of the shell portion when all repeating units included in the particulate polymer (i.e., the total of the polymer of the core portion and the polymer of the shell portion) are taken to be 100 mass % is preferably 0.01 mass % or more, and more preferably 0.1 mass % or more, and is preferably 1.0 mass % or less, and more preferably 0.6 mass % or less. When the proportion in the particulate polymer constituted by an acidic group-containing monomer unit of the shell portion is 0.01 mass % or more, the polarity of the particulate polymer surface can be further increased, and residual gas content of a secondary battery can be further reduced. On the other hand, when the proportion in the particulate polymer constituted by an acidic group-containing monomer unit of the shell portion is 1.0 mass % or less, the amount of water that is imported into a secondary battery through the particulate polymer can be reduced, and cycle characteristics of the secondary battery can be further improved.

—Other Monomer Units—

Examples of other monomer units besides an aromatic monovinyl monomer unit and an acidic group-containing monomer unit (i.e., other monomer units) that can be included in the polymer forming the shell portion include, but are not specifically limited to, a cross-linkable monomer unit, a (meth)acrylic acid ester monomer unit, and a nitrile group-containing monomer unit previously described in the "Core portion" section. Of these other monomer units, the inclusion of a nitrile group-containing monomer unit in the polymer of the shell portion is preferable.

Examples of nitrile group-containing monomers that can form a nitrile group-containing monomer unit in the polymer of the shell portion include the same nitrile group-containing monomers as previously described in the "Core portion" section. One of these nitrile group-containing monomers may be used individually, or a plurality of these nitrile group-containing monomers may be used in combination. Of these nitrile group-containing monomers, acrylonitrile and methacrylonitrile are preferable, and acrylonitrile is more preferable.

The proportion constituted by a nitrile group-containing monomer unit included in the polymer of the shell portion when all repeating units included in the polymer of the shell portion are taken to be 100 mass % is preferably 1.0 mass % or more, and more preferably 3.0 mass % or more, and is preferably 10 mass % or less, and more preferably 7.0 mass % or less. When the proportion in the polymer of the shell portion constituted by a nitrile group-containing monomer unit is within any of the ranges set forth above, strength of the particulate polymer can be ensured while also controlling the 72-hour degree of swelling in electrolyte solution and 240-hour degree of swelling in electrolyte solution of the particulate polymer and the surface acid content of the particulate polymer well. Consequently, the adhesiveness of a functional layer after immersion in electrolyte solution and the rate characteristics and cycle characteristics of a secondary battery can be further improved. In addition, the residual gas content of the secondary battery can be further reduced, and storage characteristics of the secondary battery can be enhanced.

Moreover, the proportion constituted by a nitrile group-containing monomer unit included in the polymer of the shell portion when all repeating units included in the particulate polymer (i.e., the total of the polymer of the core portion and the polymer of the shell portion) are taken to be 100 mass % is preferably 0.3 mass % or more, and more preferably 0.6 mass % or more, and is preferably 3.0 mass % or less, and more preferably 2.0 mass % or less. When the proportion in the particulate polymer constituted by a nitrile group-containing monomer unit of the shell portion is within any of the ranges set forth above, strength of the particulate polymer can be ensured while also controlling the 72-hour degree of swelling in electrolyte solution and 240-hour degree of swelling in electrolyte solution of the particulate polymer and the surface acid content of the particulate polymer well. Consequently, the adhesiveness of a functional layer after immersion in electrolyte solution and the rate characteristics and cycle characteristics of a secondary battery can be further improved. In addition, the residual gas content of the secondary battery can be further reduced, and storage characteristics of the secondary battery can be enhanced.

<<Production Method>>

The particulate polymer having the core-shell structure set forth above can be produced using monomers for the polymer of the core portion and monomers for the polymer of the shell portion through stepwise polymerization in which the ratio of these monomers is changed over time, for example. Specifically, the particulate polymer can be produced by continuous, multi-step emulsion polymerization or multi-step suspension polymerization in which a polymer of a preceding step is then covered by a polymer of a subsequent step.

The following describes one example of a case in which the particulate polymer having the core-shell structure set forth above is obtained by multi-step emulsion polymerization.

In the polymerization, an anionic surfactant such as sodium dodecylbenzenesulfonate or sodium dodecyl sulfate, a non-ionic surfactant such as polyoxyethylene nonylphenyl ether or sorbitan monolaurate, or a cationic surfactant such as octadecylamine acetate may be used as an emulsifier in accordance with a standard method. Moreover, a peroxide such as t-butyl peroxy-2-ethylhexanoate, potassium persulfate, or cumene peroxide, or an azo compound such as 2,2'-azobis(2-methyl-N-(2-hydroxyethyl)-propionamide) or 2,2'-azobis(2-amidinopropane) hydrochloride may be used as a polymerization initiator.

The polymerization procedure involves initially mixing monomers for forming the core portion and the emulsifier, and performing emulsion polymerization as one batch to obtain a particulate polymer that forms the core portion. The particulate polymer having the core-shell structure set forth above can then be obtained by performing polymerization of monomers for forming the shell portion in the presence of the particulate polymer forming the core portion.

In this polymerization, it is preferable that the monomers for forming the polymer of the shell portion are supplied into the polymerization system continuously or divided into a plurality of portions in a case in which a particulate polymer in which a shell portion partially covers an outer surface of a core portion is to be produced. As a result of the monomers for forming the polymer of the shell portion being supplied into the polymerization system in portions or continuously, the polymer forming the shell portion can be formed as particles that bond to the core portion such as to form a shell portion that partially covers the core portion.

<Binder for Functional Layer>

The presently disclosed slurry composition preferably further contains a binder for a functional layer formed of a polymer having a glass-transition temperature of lower than 20° C. in addition to the particulate polymer having the core-shell structure set forth above.

Note that the binder for a functional layer is preferably water-insoluble.

<<Glass-Transition Temperature>>

The glass-transition temperature of the binder for a functional layer is required to be lower than 20° C., is preferably lower than 15° C., and more preferably 12° C. or lower, and is preferably −40° C. or higher, and more preferably −20° C. or higher. By using a slurry composition that contains a binder for a functional layer having a glass-transition temperature of lower than 20° C. in addition to the particulate polymer set forth above, adhesiveness of a functional layer after immersion in electrolyte solution can be further improved while also further enhancing rate characteristics of a secondary battery. On the other hand, storage characteristics of a secondary battery can be improved when the glass-transition temperature of the binder for a functional layer is −40° C. or higher.

Note that the glass-transition temperature of the binder for a functional layer can be adjusted by altering the types and proportions of monomers used to produce the binder for a functional layer, for example. More specifically, the glass-transition temperature of the binder for a functional layer can be raised by increasing the proportion in which an aromatic monovinyl monomer is used to produce the binder for a functional layer.

<<Surface Acid Content>>

The surface acid content of the binder for a functional layer is preferably 0.05 mmol/g or more, more preferably 0.08 mmol/g or more, and even more preferably 0.10 mmol/g or more, and is preferably 0.50 mmol/g or less, more preferably 0.40 mmol/g or less, and even more preferably 0.30 mmol/g or less. When the surface acid content of the binder for a functional layer is 0.05 mmol/g or more, residual gas content of a secondary battery can be further reduced. On the other hand, when the surface acid content of the binder for a functional layer is 0.50 mmol/g or less, cycle characteristics of a secondary battery can be further improved.

Note that the surface acid content of the binder for a functional layer can be adjusted by altering the types and proportions of monomers used to produce the binder for a functional layer, for example. More specifically, the surface acid content of the binder for a functional layer can be increased by increasing the proportion in which an acidic group-containing monomer is used in production of the binder for a functional layer and by using a monomer having a plurality of acidic groups, such as itaconic acid, as the acidic group-containing monomer.

<<Volume-Average Particle Diameter>>

The volume-average particle diameter of the binder for a functional layer is preferably 0.01 μm or more, more preferably 0.05 μm or more, and even more preferably 0.14 μm or more, and is preferably less than 0.60 μm, and more preferably less than 0.45 μm. When the volume-average particle diameter of the binder for a functional layer is 0.01 μm or more, residual gas content of a secondary battery can be further reduced. On the other hand, when the volume-average particle diameter of the binder for a functional layer is less than 0.60 μm, adhesiveness of a functional layer after immersion in electrolyte solution can be further improved.

Note that the volume-average particle diameter of the binder for a functional layer can be adjusted by altering the types and proportions of monomers used to produce the binder for a functional layer and/or altering the polymerization conditions (for example, the used amount of emulsifier) of the binder for a functional layer, for example.

<<Degree of Swelling in Electrolyte Solution>>

The degree of swelling of the binder for a functional layer when immersed in the previously described specific electrolyte solution for measurement for 72 hours is preferably a factor of 5.0 or less, and more preferably a factor of 4.0 or less. When the 72-hour degree of swelling in electrolyte solution of the binder for a functional layer is a factor of 5.0 or less, the binder for a functional layer does not excessively elute into electrolyte solution, and adhesiveness of a functional layer after immersion in electrolyte solution can be further improved while also further reducing residual gas content of a secondary battery. The lower limit for the 72-hour degree of swelling in electrolyte solution of the binder for a functional layer is not specifically limited but is normally a factor of 1.0 or more.

Note that the 72-hour degree of swelling in electrolyte solution of the binder for a functional layer can be adjusted by altering the types and proportions of monomers used to produce the binder for a functional layer, for example.

<<Chemical Composition>>

Although no specific limitations are placed on the chemical composition of the binder for a functional layer so long as the binder for a functional layer has the glass-transition temperature set forth above, the binder for a functional layer (i.e., a polymer forming the binder for a functional layer) preferably includes at least an aromatic monovinyl monomer unit and an acidic group-containing monomer unit.

[Aromatic Monovinyl Monomer Unit]

Examples of aromatic monovinyl monomers that can form an aromatic monovinyl monomer unit of the binder for a functional layer include the same aromatic monovinyl monomers as previously described in the "Particulate polymer" section. One of these aromatic monovinyl monomers may be used individually, or a plurality of these aromatic monovinyl monomers may be used in combination. Of these aromatic monovinyl monomers, styrene is preferable.

The proportion constituted by an aromatic monovinyl monomer unit included in the binder for a functional layer when all repeating units included in the binder for a functional layer are taken to be 100 mass % is preferably 15 mass % or more, and more preferably 23 mass % or more, and is preferably 80 mass % or less, and more preferably 70 mass % or less. When the proportion in the binder for a functional layer constituted by an aromatic monovinyl monomer unit is within any of the ranges set forth above, a balance of flexibility and rigidity of the binder for a functional layer is ensured. Consequently, the adhesiveness of a functional layer after immersion in electrolyte solution and the rate characteristics and cycle characteristics of a secondary battery can be improved in a good balance.

[Acidic Group-Containing Monomer Unit]

Examples of acidic group-containing monomers that can form an acidic group-containing monomer unit in the binder for a functional layer include the same acidic group-containing monomers as previously described in the "Particulate polymer" section. One of these acidic group-containing monomers may be used individually, or a plurality of these acidic group-containing monomers may be used in combination. Of these acidic group-containing monomers, carboxy group-containing monomers are preferable, acrylic acid, methacrylic acid, and itaconic acid are more preferable, and itaconic acid is even more preferable.

The proportion constituted by an acidic group-containing monomer unit included in the binder for a functional layer when all repeating units included in the binder for a functional layer are taken to be 100 mass % is preferably 1.0 mass % or more, and more preferably 2.0 mass % or more, and is preferably 6.0 mass % or less, and more preferably 5.0 mass % or less. The residual gas content of a secondary battery can be further reduced when the proportion in the binder for a functional layer constituted by an acidic group-containing monomer unit is 1.0 mass % or more, whereas cycle characteristics of the secondary battery can be improved when this proportion is 6.0 mass % or less.

[Other Monomer Units]

The binder for a functional layer can include monomer units other than an aromatic monovinyl monomer unit and an acidic group-containing monomer unit (i.e., other monomer units). Examples of such other monomer units include an aliphatic conjugated diene monomer unit derived from an aliphatic conjugated diene monomer such as 1,3-butadiene, 2-methyl-1,3-butadiene (isoprene), or 2,3-dimethyl-1,3-butadiene, a hydroxy group-containing monomer unit derived from a hydroxy group-containing monomer such as 2-hydroxyethyl acrylate, and a (meth)acrylic acid ester monomer unit and a cross-linkable monomer unit previously described in the "Particulate polymer" section.

Note that the binder for a functional layer may include one type of other monomer unit or may include two or more types of other monomer units.

<<Production Method>>

The method of polymerization of the binder for a functional layer can, for example, be any of solution polymerization, suspension polymerization, bulk polymerization, and emulsion polymerization without any specific limitations. Moreover, the polymerization reaction may be addition polymerization such as ionic polymerization, radical polymerization, or living radical polymerization. The polymerization may be carried out with a commonly used emulsifier, dispersant, polymerization initiator, chain transfer agent, or the like, and the amount thereof may also be the same as commonly used.

<<Amount>>

Although no specific limitations are placed on the amount of the binder for a functional layer that is used in the presently disclosed slurry composition, the amount of the binder for a functional layer per 100 parts by mass of the particulate polymer is preferably 1 part by mass or more, more preferably 10 parts by mass or more, even more preferably 15 parts by mass or more, and particularly preferably 20 parts by mass or more, and is preferably 50 parts by mass or less, more preferably 40 parts by mass or less, and even more preferably 30 parts by mass or less. The adhesiveness of a functional layer after immersion in electrolyte solution can be further improved when the amount of the binder for a functional layer is 1 part by mass or more per 100 parts by mass of the particulate polymer, whereas the blocking resistance of a battery member that includes a functional layer can be ensured when the amount of the binder for a functional layer is 50 parts by mass or less per 100 parts by mass of the particulate polymer.

<Solvent>

The solvent contained in the presently disclosed slurry composition can be a known solvent that can serve as a dispersion medium for at least the previously described particulate polymer. Of such solvents, water is preferable as the solvent of the slurry composition. Note that at least some of the solvent of the slurry composition may be a polymerization solvent that was used in production of the particulate polymer and/or the binder for a functional layer, but is not specifically limited thereto.

<Other Components>

The presently disclosed slurry composition may contain any other components besides the components described above. Commonly known components can be used as these other components without any specific limitations so long as they do not affect battery reactions. One of such other components may be used individually, or two or more of such other components may be used in combination.

Examples of other components that may be used include non-conductive particles, wetting agents (polyethylene oxide, polypropylene oxide, etc.), and water-soluble polymers (carboxymethyl cellulose and salts thereof, polyvinyl alcohol, etc.)

When a polymer is said to be "water-soluble" in the present disclosure, this means that when 0.5 g of the polymer is dissolved in 100 g of water at a temperature of 25° C., insoluble content is less than 1.0 mass %.

Any known non-conductive particles that are used in non-aqueous secondary batteries can be used without any specific limitations as non-conductive particles compounded in the slurry composition.

Specifically, although both inorganic fine particles and organic fine particles other than the particulate polymer and the binder for a functional layer described above can be used as the non-conductive particles, inorganic fine particles are normally used. The material of the non-conductive particles is preferably an electrochemically stable material that is present stably in the environment of use of a non-aqueous secondary battery. Examples of materials of the non-conductive particles that are preferable from the viewpoints set forth above include particles of oxides such as aluminum oxide (alumina), hydrous aluminum oxide (boehmite), silicon oxide, magnesium oxide (magnesia), calcium oxide, titanium oxide (titania), $BaTiO_3$, ZrO, and alumina-silica complex oxide; particles of nitrides such as aluminum nitride and boron nitride; particles of covalently bonded crystals such as silicon and diamond; particles of sparingly soluble ionic crystals such as barium sulfate, calcium fluoride, and barium fluoride; and fine particles of clays such as talc and montmorillonite. These particles may be subjected to element substitution, surface treatment, solid solution treatment, and/or the like as necessary.

In a case in which organic fine particles are used as non-conductive particles, the glass-transition temperature and/or melting point of the organic fine particles is normally higher than 150° C., preferably 180° C. or higher, and more preferably 200° C. or higher.

One of these types of non-conductive particles may be used individually, or two or more of these types of non-conductive particles may be used in combination.

Although no specific limitations are placed on the amount of non-conductive particles in the slurry composition, the amount of non-conductive particles per 100 parts by mass of the particulate polymer is preferably not less than 300 parts by mass and not more than 1,500 parts by mass.

Moreover, although no specific limitations are placed on the amount of wetting agent in the slurry composition, the amount of wetting agent per 100 parts by mass of the particulate polymer is preferably 0.5 parts by mass or more, and more preferably 0.7 parts by mass or more, and is preferably 5 parts by mass or less, and more preferably 3 parts by mass or less. When the amount of wetting agent is 0.5 parts by mass or more per 100 parts by mass of the particulate polymer, the slurry composition can be applied with sufficient uniformity, which enables further improvement of the adhesiveness of a functional layer after immersion in electrolyte solution. On the other hand, when the amount of wetting agent is 5 parts by mass or less per 100 parts by mass of the particulate polymer, deterioration of rate characteristics due to an increase of low molecular weight components can be sufficiently inhibited.

Furthermore, although no specific limitations are placed on the amount of water-soluble polymer in the slurry composition, the amount of water-soluble polymer per 100 parts by mass of the particulate polymer is preferably 10 parts by mass or less, and more preferably 6 parts by mass or less. When the amount of water-soluble polymer is 10 parts by mass or less per 100 parts by mass of the particulate polymer, deterioration of rate characteristics due to formation of a film of the water-soluble polymer can be sufficiently inhibited.

<Production Method>

No specific limitations are placed on the method by which the slurry composition is produced. The slurry composition can be produced by, for example, mixing the particulate polymer, the solvent, and the binder for a functional layer and/or other components that are used as necessary. Although the mixing can be carried out by any method, the mixing is normally carried out using a disperser as a mixer to efficiently disperse the components.

The disperser is preferably a device that enables homogeneous dispersion and mixing of the components. Examples of such devices include a ball mill, a sand mill, a pigment disperser, a grinding machine, an ultrasonic disperser, a homogenizer, and a planetary mixer. A high-level disperser such as a bead mill, a roll mill, or a FILMIX may also be used from a viewpoint that high dispersing shear can be applied.

(Functional Layer)

The presently disclosed slurry composition for a non-aqueous secondary battery functional layer set forth above can be used to form a functional layer on a suitable substrate. Specifically, the slurry composition can be dried on a suitable substrate to form a functional layer. In other words, the functional layer is formed of a dried product of the slurry composition set forth above, normally contains the previously described particulate polymer, and optionally contains the previously described binder for a functional layer and/or other components. Note that in a case in which the previously described particulate polymer and/or binder for a functional layer includes a cross-linkable monomer unit, the particulate polymer and/or binder for a functional layer may be cross-linked during drying of the slurry composition or during heat treatment optionally performed after the drying (i.e., the functional layer may contain a cross-linked product of the previously described particulate polymer and/or binder for a functional layer). The preferred ratio of components contained in the functional layer is the same as the preferred ratio of these components in the presently disclosed slurry composition for a non-aqueous secondary battery functional layer.

A functional layer that is formed using the presently disclosed slurry composition can display excellent adhesiveness after immersion in electrolyte solution. In addition, a battery member that includes this functional layer can be used to produce a secondary battery that has excellent rate characteristics and cycle characteristics and reduced residual gas content.

<Substrate>

No specific limitations are placed on the substrate onto which the slurry composition is applied and on which the functional layer is formed. For example, the substrate may be a separator substrate in a case in which the functional layer is used as a member that constitutes part of a separator and may be an electrode substrate obtained by forming an electrode mixed material layer on a current collector in a case in which the functional layer is used as a member that constitutes part of an electrode. No specific limitations are placed on the use of the functional layer formed on the substrate. For example, the functional layer may be formed on a separator substrate or the like and then used in this form as a battery member such as a separator. Alternatively, the functional layer may be formed on an electrode substrate and then used as an electrode. Further alternatively, the functional layer may be formed on a releasable substrate, be peeled from the substrate, and then be pasted onto another substrate to be used as a battery member.

However, it is preferable that a separator substrate or an electrode substrate is used as the substrate from a viewpoint of omitting a step of peeling a releasable substrate from the functional layer and raising battery member production efficiency.

<<Separator Substrate>>

The separator substrate is not specifically limited and may, for example, be any of those described in JP2012-204303A. Of these separator substrates, a microporous membrane made of polyolefinic (polyethylene, polypropylene, polybutene, or polyvinyl chloride) resin is preferred because such a membrane can reduce the total thickness of the separator, which increases the ratio of electrode active material in a secondary battery and consequently increases the volumetric capacity.

Note that the separator substrate may also include, in part thereof, any layer other than a functional layer formed from the presently disclosed slurry composition that can display an expected function. For example, the separator substrate may include, in part thereof, a porous membrane layer that contains non-conductive particles and a binder, but does not contain the previously described particulate polymer having a core-shell structure. More specifically, the separator substrate may include a porous membrane layer containing non-conductive particles and a binder at one side or both sides of a microporous membrane formed of a polyolefinic resin such as described above. Note that the "non-conductive particles" in the porous membrane layer can, for example, be any of the examples of non-conductive particles given in the "Slurry composition for non-aqueous secondary battery functional layer" section. Moreover, the "binder" in the porous membrane layer can, for example, be any of the binders given as examples of the "binder for a functional layer" in the "Slurry composition for non-aqueous secondary battery functional layer" section or any other known binder.

<<Electrode Substrate>>

The electrode substrate (positive/negative electrode substrate) is not specifically limited and may, for example, be an electrode substrate obtained by forming an electrode mixed material layer on a current collector.

Moreover, the current collector, components in the electrode mixed material layer (for example, an electrode active material (positive/negative electrode active material) and a binder for an electrode mixed material layer (binder for a positive/negative electrode mixed material layer)), and the method by which the electrode mixed material layer is formed on the current collector can be known examples thereof such as any of those described in JP2013-145763A, for example.

Note that the electrode substrate may include, in part thereof, any layer other than a functional layer formed from the presently disclosed slurry composition that has an expected function (for example, a porous membrane layer containing non-conductive particles and a binder such as previously described in the "Separator substrate" section).

<<Releasable Substrate>>

The releasable substrate is not specifically limited and may be any known releasable substrate.

<Formation Method of Functional Layer>

Examples of methods by which the functional layer may be formed on a substrate such as the separator substrate or electrode substrate described above include:

(1) a method in which the slurry composition is applied onto the surface of a separator substrate or electrode substrate (surface at the electrode mixed material layer-side in the case of an electrode substrate; same applies below) and is then dried;

(2) a method in which a separator substrate or electrode substrate is immersed in the slurry composition and is then dried; and (3) a method in which the slurry composition is applied onto a releasable substrate and is dried to produce a functional layer that is then transferred onto the surface of a separator substrate or electrode substrate.

Of these methods, method (1) is particularly preferable since it allows simple control of the thickness of the functional layer. In more detail, method (1) includes a step of applying the slurry composition onto a separator substrate or electrode substrate (application step) and a step of drying the composition for a functional layer that has been applied onto the separator substrate or electrode substrate to form a functional layer (drying step).

No specific limitations are placed on the method by which the slurry composition is applied onto the separator substrate or electrode substrate in the application step. For example, a method such as spray coating, doctor blading, reverse roll coating, direct roll coating, gravure coating, extrusion coating, or brush coating may be used.

The slurry composition on the substrate may be dried by any commonly known method in the drying step without any specific limitations. For example, the drying may be carried out through drying by warm, hot, or low-humidity air; drying in a vacuum; or drying by irradiation with infrared light, electron beams, or the like. Although no specific limitations are placed on the drying conditions, the drying temperature is preferably 30° C. to 80° C. and the drying time is preferably 30 seconds to 10 minutes.

The thickness of the functional layer formed on the substrate is preferably 0.1 μm or more, more preferably 0.3 μm or more, and even more preferably 0.5 μm or more, and is preferably 3.0 μm or less, more preferably 1.5 μm or less, and even more preferably 1.0 μm or less. A functional layer thickness of 0.1 μm or more can ensure sufficient strength of the functional layer, whereas a functional layer thickness of 3.0 μm or less can further improve low-temperature output characteristics of a secondary battery.

(Separator for Non-Aqueous Secondary Battery)

The presently disclosed separator includes a separator substrate and a functional layer formed from the presently disclosed slurry composition on at least one side of the separator substrate. Note that the separator substrate and the functional layer included in the separator are each the same as previously described in the "Functional layer" section.

As a result of including a functional layer formed using the presently disclosed slurry composition, the presently disclosed separator can adhere well to another battery member (for example, an electrode) adjacent thereto through the functional layer after immersion in electrolyte solution. In addition, the presently disclosed separator can cause a secondary battery to display excellent rate characteristics and cycle characteristics and can also reduce residual gas content of the secondary battery.

(Non-Aqueous Secondary Battery)

The presently disclosed non-aqueous secondary battery includes the presently disclosed separator for a non-aqueous secondary battery set forth above. More specifically, the presently disclosed non-aqueous secondary battery includes a positive electrode, a negative electrode, a separator, and an electrolyte solution, wherein the separator is the presently disclosed separator for a non-aqueous secondary battery that includes a separator substrate and a functional layer.

The presently disclosed non-aqueous secondary battery has excellent rate characteristics and cycle characteristics and low residual gas content as a result of including the presently disclosed separator for a non-aqueous secondary battery.

<Positive Electrode and Negative Electrode>

Although at least the separator includes a functional layer in the presently disclosed secondary battery, the positive electrode and the negative electrode may also each include a functional layer. An electrode produced by forming an electrode mixed material layer on a current collector to form an electrode substrate and then providing a functional layer on the electrode substrate can be used as a positive electrode or negative electrode that includes a functional layer. Note that the electrode substrate and the separator substrate can be any of the same examples as given in the "Functional layer" section.

Moreover, an electrode formed of an electrode substrate such as previously described can be used as a positive electrode or negative electrode that does not include a functional layer without any specific limitations.

<Electrolyte Solution>

The electrolyte solution is normally an organic electrolyte solution obtained by dissolving a supporting electrolyte in an organic solvent. The supporting electrolyte may, for example, be a lithium salt in the case of a lithium ion secondary battery. Examples of lithium salts that can be used include $LiPF_6$, $LiAsF_6$, $LiBF_4$, $LiSbF_6$, $LiAlCl_4$, $LiClO_4$, $CF_3SO_3Li$, $C_4F_9SO_3Li$, $CF_3COOLi$, $(CF_3CO)_2NLi$, $(CF_3SO_2)_2NLi$, and $(C_2F_5SO_2)NLi$. Of these lithium salts, $LiPF_6$, $LiClO_4$, and $CF_3SO_3Li$ are preferable as they readily dissolve in solvents and exhibit a high degree of dissociation. One electrolyte may be used individually, or two or more electrolytes may be used in combination. In general, lithium ion conductivity tends to increase when a supporting electrolyte having a high degree of dissociation is used. Therefore, lithium ion conductivity can be adjusted through the type of supporting electrolyte that is used.

The organic solvent used in the electrolyte solution is not specifically limited so long as the supporting electrolyte can dissolve therein. Examples of organic solvents that can suitably be used in a lithium ion secondary battery, for example, include carbonates such as dimethyl carbonate (DMC), ethylene carbonate (EC), diethyl carbonate (DEC), propylene carbonate (PC), butylene carbonate (BC), and methyl ethyl carbonate (MEC); esters such as γ-butyrolactone and methyl formate; ethers such as 1,2-dimethoxyethane and tetrahydrofuran; and sulfur-containing compounds such as sulfolane and dimethyl sulfoxide. Furthermore, a mixture of such solvents may be used. Of these solvents, carbonates are preferable due to having a high permittivity and a wide stable potential region. In general, lithium ion conductivity tends to increase when a solvent having a low viscosity is used. Therefore, lithium ion conductivity can be adjusted through the type of solvent that is used.

The concentration of the electrolyte in the electrolyte solution may be adjusted as appropriate. Furthermore, known additives may be added to the electrolyte solution.

<Production Method of Non-Aqueous Secondary Battery>

The secondary battery can be produced by, for example, stacking the positive electrode and the negative electrode with the presently disclosed separator for a non-aqueous secondary battery in-between, performing rolling, folding, or the like of the resultant laminate, as necessary, to place the laminate in a battery container, injecting the electrolyte solution into the battery container, and sealing the battery container. In order to prevent pressure increase inside the battery and occurrence of overcharging or overdischarging, an expanded metal; an overcurrent preventing device such as a fuse or a PTC device; or a lead plate may be provided in the battery container as necessary. The shape of the battery may be a coin type, button type, sheet type, cylinder type, prismatic type, flat type, or the like.

EXAMPLES

The following provides a more specific description of the present disclosure based on examples. However, the present disclosure is not limited to the following examples. In the following description, "%" and "parts" used in expressing quantities are by mass, unless otherwise specified.

Moreover, in the case of a polymer that is produced through copolymerization of a plurality of types of monomers, the proportion in the polymer constituted by a monomer unit that is formed through polymerization of a given monomer is normally, unless otherwise specified, the same as the ratio (charging ratio) of the given monomer among all monomers used in polymerization of the polymer.

The following methods were used in the examples and comparative examples to measure and evaluate the glass-transition temperature, surface acid content, degree of swelling in electrolyte solution, and volume-average particle diameter of a particulate polymer and a binder for a functional layer, the adhesiveness after immersion in electrolyte solution of a functional layer, the blocking resistance of a separator, and the rate characteristics, cycle characteristics, storage characteristics, and reduction of residual gas content of a lithium ion secondary battery.

<Glass-Transition Temperature>

A water dispersion of a polymer (particulate polymer or binder for a functional layer) that was a measurement subject was dried at a temperature of 25° C. for 48 hours to obtain a powdered measurement sample.

Next, 10 mg of the measurement sample was weighed into an aluminum pan and was then measured by a differential scanning calorimeter (produced by SIT NanoTechnology Inc.; product name: EXSTAR DSC6220) under conditions prescribed by JIS Z8703 with a measurement temperature range of −100° C. to 200° C. and a heating rate of 20° C./min to obtain a differential scanning calorimetry (DSC) curve. Note that an empty aluminum pan was used as a reference. The temperature at which a derivative signal (DDSC) displayed a peak in the heating process was determined as the glass-transition temperature (° C.). Note that in a case in which multiple peaks were measured, the temperature at which a peak having greatest displacement was displayed was taken to be the glass-transition temperature of the polymer.

<Surface Acid Content>

A water dispersion of a polymer (particulate polymer or binder for a functional layer) that was a measurement subject was loaded into a glass vessel that had been washed with distilled water, a solution conductivity meter was set up, and stirring was performed. Note that the stirring was continued until the subsequently described addition of hydrochloric acid was complete.

Next, 0.1N sodium hydroxide aqueous solution was added to the water dispersion of the polymer to adjust the electrical conductivity of the water dispersion of the polymer to 2.5 mS to 3.0 mS. The electrical conductivity was measured once 6 minutes had elapsed after this addition. The resulting value was taken to be the electrical conductivity at the start of measurement.

Next, 0.5 mL of 0.1N hydrochloric acid was added to the water dispersion of the polymer, and the electrical conductivity was measured 30 seconds thereafter. Subsequently, a further 0.5 mL of 0.1N hydrochloric acid was added, and the electrical conductivity was measured 30 seconds thereafter. This operation was repeated at 30 second intervals until the electrical conductivity of the water dispersion of the polymer rose to at least as high as the electrical conductivity at the start of measurement.

Figure 2:
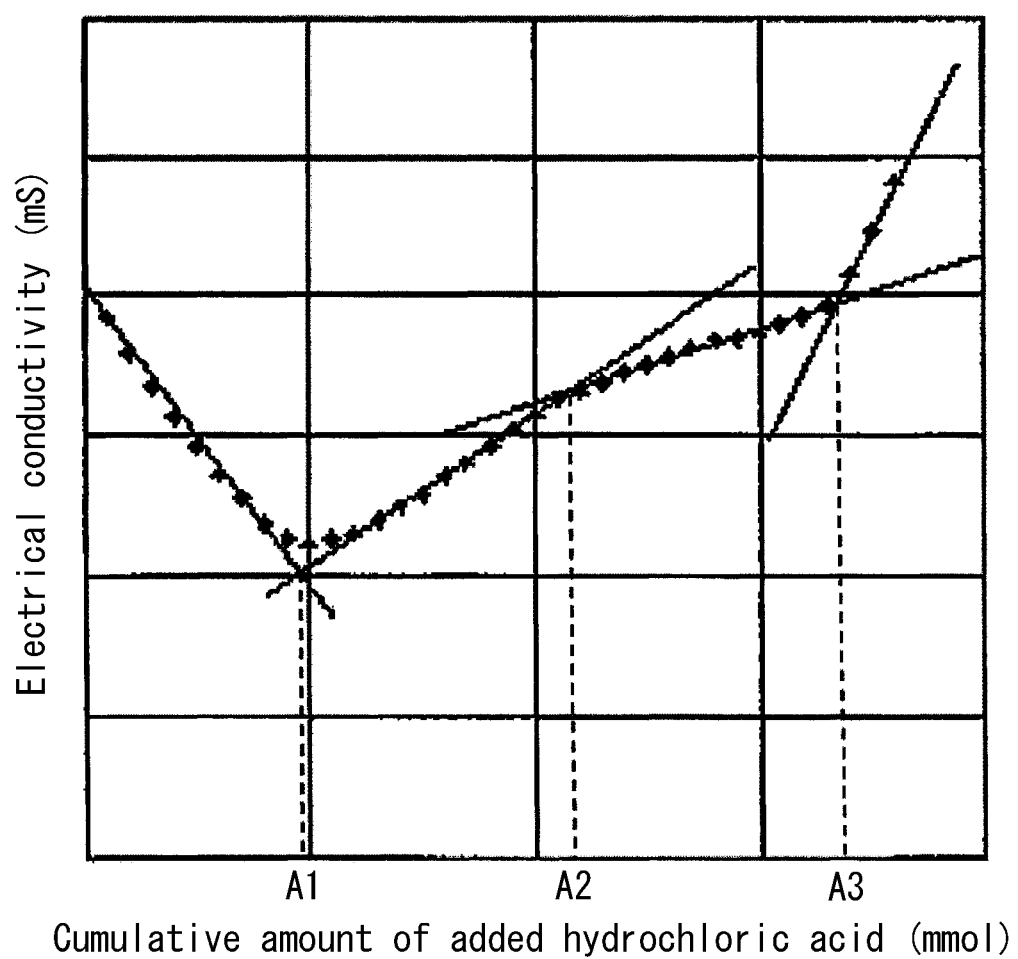
FIG. 2 is a graph indicating a hydrochloric acid additive amount-electrical conductivity curve prepared in calculation of the surface acid content of a polymer.

The obtained electrical conductivity data was plotted as a graph with electrical conductivity (units: mS) on a vertical axis (Y-coordinate axis) and cumulative amount of added hydrochloric acid (units: mmol) on a horizontal axis (X-coordinate axis). In this manner, a hydrochloric acid additive amount-electrical conductivity curve with three inflection points was obtained as illustrated in FIG. 2. The X coordinates of the three inflection points and the X coordinate at the end of addition of hydrochloric acid were taken to be P1, P2, P3, and P4 in order from the smallest thereof. Linear approximations L1, L2, L3, and L4 were determined by the least squares method for the data in four sections that were sections corresponding to X coordinates from zero to coordinate P1, from coordinate P1 to coordinate P2, from coordinate P2 to coordinate P3, and from coordinate P3 to coordinate P4. The X coordinate of an intersection point of the linear approximation L1 and the linear approximation L2 was taken to be A1 (mmol), the X coordinate of an intersection point of the linear approximation L2 and the linear approximation L3 was taken to be A2 (mmol), and the X coordinate of an intersection point of the linear approximation L3 and the linear approximation L4 was taken to be A3 (mmol).

The surface acid content S per 1 g of the polymer was calculated by the following formula as a hydrochloric acid-equivalent value (mmol/g).

Surface acid content $S$ per 1 g of polymer=$(A2–A1)$/Amount of solid content in water dispersion of polymer <Degree of Swelling in Electrolyte Solution>
<<72-Hour Degree of Swelling in Electrolyte Solution>>

A water dispersion of a polymer (particulate polymer or binder for a functional layer) that was a measurement subject was loaded into a petri dish made of polytetrafluoroethylene. The water dispersion in the petri dish was dried at a temperature of 25° C. for 48 hours to obtain a powdered sample. Next, 0.2 g of the obtained sample was pressed at a temperature of 200° C. and a pressure of 5 MPa for 2 minutes to obtain a test specimen. The weight of the obtained test specimen was measured and was taken to be W0.

Next, the obtained test specimen was immersed in an electrolyte solution for measurement having a temperature of 60° C. for 72 hours. The electrolyte solution for measurement was a solution obtained by dissolving $LiPF_6$ (supporting electrolyte) with a concentration of 1 mol/L in a mixed solvent of ethylene carbonate (EC), diethyl carbonate (DEC), and vinylene carbonate (VC) (volume ratio: EC/DEC/VC=68.5/30/1.5).

After this immersion, the test specimen was removed from the electrolyte solution for measurement, and electrolyte solution for measurement on the surface of the test specimen was wiped off. The weight of the test specimen after immersion was measured and was taken to be W1. The measured weights W0 and W1 were used to calculate the 72-hour degree of swelling in electrolyte solution (=W1/W0).

<<240-Hour Degree of Swelling in Electrolyte Solution>>

The 240-hour degree of swelling in electrolyte solution was calculated in the same way as the 72-hour degree of swelling in electrolyte solution with the exception that the time for which the test specimen was immersed in the electrolyte solution for measurement was changed from 72 hours to 240 hours. Note that the 240-hour degree of swelling in electrolyte solution was only measured for a particulate polymer and was not measured for a binder for a functional layer.

<Volume-Average Particle Diameter>

The volume-average particle diameter of a polymer (particulate polymer or binder for a functional layer) was measured by laser diffraction. Specifically, a water dispersion of the polymer that had been adjusted to a solid content concentration of 0.1 mass % was used as a sample. In a particle diameter distribution (by volume) measured using a laser diffraction particle diameter distribution analyzer (produced by Beckman Coulter, Inc.; product name: LS-13 320), the particle diameter D50 at which cumulative volume calculated from a small diameter end of the distribution reached 50% was taken to be the volume-average particle diameter.

<Adhesiveness After Immersion in Electrolyte Solution>

A separator made of a single layer of polyethylene (thickness: 9 μm) that had been produced by a wet method was prepared as a separator substrate. A slurry composition for a non-aqueous secondary battery functional layer was applied onto one side of the separator substrate, and the slurry composition on the separator substrate was dried at 50° C. for 10 minutes to form a functional layer (thickness: 1.0 μm). The separator having this functional layer at one side was used as a separator for evaluation.

In addition, a negative electrode was produced in the same way as in Example 1, described below, as a negative electrode for evaluation.

The negative electrode for evaluation and the separator for evaluation obtained as described above were each cut out as a rectangle of 10 mm×100 mm. The negative electrode mixed material layer of the negative electrode was arranged along the surface of the functional layer of the separator to obtain a test specimen, and this test specimen was loaded into laminate packing with approximately 400 μL of electrolyte solution. After 1 hour, the test specimen was pressed, together with the laminate packing, at 80° C. with a pressure of 1.0 MPa for 15 minutes. Note that the electrolyte solution had the same chemical composition as the electrolyte solution for measurement used in measurement of the "degree of swelling in electrolyte solution".

The test specimen was then taken out, and electrolyte solution attached to the surface of the test specimen was wiped off. Next, the test specimen was placed with the surface at the current collector-side of the negative electrode facing downward, and cellophane tape was affixed to the surface at the current collector-side of the negative electrode. Tape prescribed by JIS Z1522 was used as the cellophane tape. The cellophane tape was secured to a horizontal test stage in advance. The stress when the separator was peeled off by pulling one end of the separator vertically upward at a pulling speed of 50 mm/min was measured. This measurement was made three times. An average value of the measured stresses was determined as the peel strength and was evaluated by the following standard. A larger peel strength indicates better adhesiveness of the functional layer after immersion in electrolyte solution and that the separator and electrode (negative electrode) can be strongly adhered through the functional layer in electrolyte solution.

A: Peel strength of 5.0 N/m or more
B: Peel strength of not less than 1.0 N/m and less than 5.0 N/m
C: Peel strength of less than 1.0 N/m <Blocking Resistance>

A separator including a functional layer at one side that was obtained in the same way as in evaluation of "adhesiveness after immersion in electrolyte solution" was cut up as squares of 5 cm in width by 5 cm in length so as to obtain two square pieces. Next, the two square pieces were overlapped such that the surfaces thereof where a functional layer had been formed on a separator substrate were facing each other, were then placed under pressure of 0.1 MPa at a temperature of 40° C., and were left for 24 hours to produce a test specimen in a pressed state (pressed test specimen). After the pressed test specimen had been left for 24 hours, the adhesion state of the two overlapped square pieces in the pressed test specimen was visually checked, and blocking resistance was evaluated in accordance with the following standard. Note that in a case in which the two overlapped square pieces were adhered together, the whole of one of the two square pieces was fixed in place and the other was pulled with a force of 0.3 N/m to check whether or not the square pieces could be peeled apart. Less adhesion of the two overlapped square pieces to each other indicates better blocking resistance of the separator including the functional layer.

A: Two square pieces are not adhered together.
B: Two square pieces are adhered together but can be peeled apart
C: Two square pieces are adhered together and cannot be peeled apart <<Rate Characteristics>>

A lithium ion secondary battery was left at rest at a temperature of 25° C. for 5 hours after injection of electrolyte solution. Next, the lithium ion secondary battery was charged to a cell voltage of 3.65 V by a 0.2 C constant current method at a temperature of 25° C. and was then subjected to 12 hours of aging treatment at a temperature of 60° C. The lithium ion secondary battery was then discharged to a cell voltage of 3.00 V by a 0.2 C constant current method at a temperature of 25° C. Thereafter, CC-CV charging of the lithium ion secondary battery was performed with a 0.2 C constant current (upper limit cell voltage: 4.35 V) and CC discharging of the lithium ion secondary battery was performed to a cell voltage of 3.00 V with a 0.2 C constant current. This charging and discharging at 0.2 C was repeated three times.

Next, the lithium ion secondary battery was subjected to 0.2 C constant current charging and discharging between cell voltages of 4.2 V and 3.00 V in an environment having a temperature of 25° C., and the discharge capacity at this time was defined as C0. The lithium ion secondary battery was subsequently CC-CV charged with a 0.2 C constant current in the same manner, was then discharged to 3.0 V with a 0.5 C constant current in an environment having a temperature of −10° C., and the discharge capacity at this time was defined as C1. A capacity maintenance rate expressed by $\Delta C=(C1/C0)\times 100(\%)$ was determined as a rate characteristic and was evaluated by the following standard. A larger value for the capacity maintenance rate $\Delta C$ indicates higher discharge capacity at high current in a low-temperature environment and lower internal resistance.

A: Capacity maintenance rate $\Delta C$ of 70% or more
B: Capacity maintenance rate $\Delta C$ of not less than 55% and less than 70%
C: Capacity maintenance rate $\Delta C$ of less than 55%

<<Cycle Characteristics>>

A lithium ion secondary battery was left at rest in a 25° C. environment for 24 hours after injection of electrolyte solution. Thereafter, the lithium ion secondary battery was subjected to a charge/discharge operation of charging to 4.2 V by a constant voltage-constant current (CC-CV) method with a 1 C charge rate (cut off condition: 0.02 C) and discharging to 3.0 V by a constant current (CC) method with a 1 C discharge rate at 25° C., and the initial capacity C2 was measured.

The lithium ion secondary battery was also repeatedly subjected to the same charge/discharge operation in a 45° C. environment, and the capacity C3 after 300 cycles was measured. A capacity maintenance rate $\Delta C' (=(C3/C2)\times 100(\%))$ was calculated and was evaluated by the following standard. A larger value for the capacity maintenance rate indicates less reduction of discharge capacity and better cycle characteristics.

A: Capacity maintenance rate $\Delta C'$ of 85% or more
B: Capacity maintenance rate $\Delta C'$ of not less than 75% and less than 85%
C: Capacity maintenance rate $\Delta C'$ of less than 75%

<<Storage Characteristics>>

A lithium ion secondary battery was left at rest at a temperature of 25° C. for 5 hours after injection of electrolyte solution. The lithium ion secondary battery was charged to 4.2 V by a 0.1 C constant current method in a 25° C. environment and was then stored at 60° C. for 240 hours. The open-circuit voltage (hereinafter, also denoted as "OCV") before storage at 60° C. and the cell OCV after storage at 60° C. for 240 hours were measured, a proportion of the OCV after storage at 60° C. for 240 hours relative to the OCV before storage at 60° C. was calculated, and this proportion was taken to be the OCV maintenance rate and was evaluated by the following standard. A larger OCV maintenance rate indicates better storage characteristics at high temperature, and thus indicates better life characteristics.

A: OCV maintenance rate of 99.0% or more
B: OCV maintenance rate of not less than 98.5% and less than 99.0%
C: OCV maintenance rate of not less than 98.0% and less than 98.5%
D: OCV maintenance rate of less than 98.0%

<Reduction of Residual Gas Content>

A lithium ion secondary battery was left at rest at a temperature of 25° C. for 5 hours after injection of electrolyte solution. Next, the lithium ion secondary battery was charged to a cell voltage of 3.65 V by a 0.2 C constant current method at a temperature of 25° C. and was then subjected to 12 hours of aging treatment at a temperature of 60° C. Thereafter, an electrode section of the cell (section of laminate of positive electrode, separator, and negative electrode) was pressed at 25 kPa for 1 minute and then gas retention area on the electrodes was measured using an ultrasonic inspection system (NAUT21 produced by Japan Probe Co., Ltd.). The gas retention area was divided by the electrode area, and the gas retention area proportion (%) obtained in this manner was evaluated by the following standard. A smaller gas retention area proportion indicates that the residual gas content of the secondary battery is reduced.

A: Gas retention area proportion of not less than 0% and less than 10%
B: Gas retention area proportion of not less than 10% and less than 25%
C: Gas retention area proportion of 25% or more Example 1

<Production of Particulate Polymer>

In core portion formation, 37.6 parts of styrene as an aromatic monovinyl monomer, 23.2 parts of 2-ethylhexyl acrylate as a (meth)acrylic acid ester monomer, 7.0 parts of acrylonitrile as a nitrile group-containing monomer, 0.1 parts of ethylene glycol dimethacrylate as a cross-linkable monomer, 2.1 parts of methacrylic acid as an acidic group-containing monomer, 0.3 parts of sodium dodecylbenzenesulfonate as an emulsifier, 150 parts of deionized water, and 0.3 parts of potassium persulfate as a polymerization initiator were loaded into a 5 MPa pressure-resistant vessel equipped with a stirrer, were sufficiently stirred, and were then heated to 70° C. to initiate polymerization. Polymerization was continued until a polymerization conversion rate of 96% was reached to yield a water dispersion containing a particulate polymer forming a core portion. Next, at the point at which the polymerization conversion rate reached 96%, 28.2 parts of styrene as an aromatic monovinyl monomer, 1.5 parts of acrylonitrile as a nitrile group-containing monomer, and 0.3 parts of methacrylic acid as an acidic group-containing monomer were continuously added and polymerization was continued under heating to 70° C. for shell portion formation. The reaction was quenched by cooling at the point at which the conversion rate reached 96% to yield a water dispersion of a particulate polymer. The obtained particulate polymer had a core-shell structure in which the outer surface of a core portion was partially covered by a shell portion.

Results of measurement of the glass-transition temperature, surface acid content, 72-hour and 240-hour degree of swelling in electrolyte solution, and volume-average particle diameter of the obtained particulate polymer are shown in Table 5.

<Production of Binder for Functional Layer>

A 5 MPa pressure-resistant vessel equipped with a stirrer was charged with 33.0 parts of 1,3-butadiene as an aliphatic conjugated diene monomer, 3.8 parts of itaconic acid as an acidic group-containing monomer, 62.2 parts of styrene as an aromatic monovinyl monomer, 1 part of 2-hydroxyethyl acrylate as a hydroxy group-containing monomer, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The reaction was quenched by cooling at the point at which the polymerization conversion rate reached 96% to yield a mixture containing a polymer. The mixture containing the polymer was adjusted to pH 8 through addition of 5% sodium hydroxide aqueous solution and was subsequently subjected to thermal-vacuum distillation to remove unreacted monomer from the mixture. Thereafter, the mixture was cooled to 30° C. or lower to yield a water dispersion of a binder for a functional layer.

Results of measurement of the glass-transition temperature, surface acid content, 72-hour degree of swelling in electrolyte solution, and volume-average particle diameter of the obtained binder for a functional layer are shown in Table 5.

<Production of Slurry Composition for Non-Aqueous Secondary Battery Functional Layer>

A mixture was obtained by mixing 100 parts (in terms of solid content) of the water dispersion of the particulate polymer, 20 parts (in terms of solid content) of the water dispersion of the binder for a functional layer, and 2 parts (in terms of solid content) of NOPTECHS® (NOPTECHS is a registered trademark in Japan, other countries, or both) ED-052 (produced by San Nopco Limited) as a wetting agent inside a stirring vessel.

The obtained mixture was diluted with deionized water to yield a slurry composition (solid content concentration: 10%). This slurry composition was used to produce a separator having a functional layer at one side in order to evaluate adhesiveness of the functional layer after immersion in electrolyte solution and blocking resistance of the separator including the functional layer. The results are shown in Table 5.

<Production of Separator Including Functional Layers at Both Sides>

A microporous membrane made of polyethylene (produced by Asahi Kasei Corporation; product name: ND412; thickness: 12 μm) was prepared. A ceramic slurry (produced by Zeon Corporation; product name: BM-2000M; containing alumina as non-conductive particles and a binder) was applied onto the surface of the prepared microporous membrane and was dried at a temperature of 50° C. for 3 minutes to obtain a separator substrate including a porous membrane layer (porous membrane layer thickness: 3 μm) at one side.

The slurry composition for a non-aqueous secondary battery functional layer described above was applied onto the surface at the porous membrane layer-side of the separator substrate described above and was dried at a temperature of 50° C. for 3 minutes. The same operations were also performed with respect to the other side of the separator substrate to obtain a separator including functional layers (functional layer thickness: each 0.6 μm) at both sides.

<Production of Negative Electrode>

A 5 MPa pressure-resistant vessel equipped with a stirrer was charged with 33 parts of 1,3-butadiene as an aliphatic conjugated diene monomer, 3.5 parts of itaconic acid as an acidic group-containing monomer, 63.5 parts of styrene as an aromatic monovinyl monomer, 0.4 parts of sodium dodecylbenzenesulfonate as an emulsifier, 150 parts of deionized water, and 0.5 parts of potassium persulfate as a polymerization initiator. These materials were sufficiently stirred and were then heated to 50° C. to initiate polymerization. The polymerization reaction was quenched by cooling at the point at which the polymerization conversion rate reached 96% to yield a mixture containing a particulate binder (styrene-butadiene copolymer). The mixture was adjusted to pH 8 through addition of 5% sodium hydroxide aqueous solution and was then subjected to thermal-vacuum distillation to remove unreacted monomer. Thereafter, the mixture was cooled to 30° C. or lower to yield a water dispersion containing a binder for a negative electrode.

A planetary mixer was charged with 48.75 parts of artificial graphite (theoretical capacity: 360 mAh/g) and 48.75 parts of natural graphite (theoretical capacity: 360 mAh/g) as negative electrode active materials, and 1 part in terms of solid content of carboxymethyl cellulose as a thickener. These materials were diluted to a solid content concentration of 60% with deionized water and were then kneaded at a rotation speed of 45 rpm for 60 minutes. Thereafter, 1.5 parts in terms of solid content of the water dispersion containing the binder for a negative electrode obtained as described above was added, and a further 40 minutes of kneading was performed at a rotation speed of 40 rpm. In addition, deionized water was added to adjust the viscosity to 3,000±500 mPa·s (measured by B-type viscometer at 25° C. and 60 rpm) and thereby produce a slurry composition for a negative electrode mixed material layer.

The slurry composition for a negative electrode mixed material layer was applied onto the surface of copper foil of 15 μm in thickness serving as a current collector using a comma coater such that the coating weight thereof was 11±0.5 mg/cm$^2$. The copper foil with the slurry composition for a negative electrode mixed material layer applied thereon was subsequently conveyed inside an oven having a temperature of 80° C. for 2 minutes and an oven having a temperature of 110° C. for 2 minutes at a speed of 400 mm/min so as to dry the slurry composition on the copper foil and thereby obtain a negative electrode web having a negative electrode mixed material layer formed on the current collector.

The negative electrode mixed material layer-side of the produced negative electrode web was subsequently roll pressed with a line pressure of 11 t (tons) in an environment having a temperature of 25±3° C. to obtain a negative electrode having a negative electrode mixed material layer density of 1.60 g/cm$^3$. Thereafter, the negative electrode was left in an environment having a temperature of 25±3° C. and a relative humidity of 50±5% for 1 week.

<Production of Positive Electrode>

A slurry composition for a positive electrode mixed material layer was produced by adding 96 parts of a lithium complex oxide of Co—Ni—Mn (CELLSEED® (CELLSEED is a registered trademark in Japan, other countries, or both); NMC111; $LiNi_{1/3}Co_{1/3}Mn_{1/3}O_2$) as a positive electrode active material, 2 parts of acetylene black (produced by Denka Company Limited; product name: HS-100) as a conductive material, and 2 parts of polyvinylidene fluoride (produced by Kureha Corporation; product name: KF-1100) as a binder into a planetary mixer, further adding N-methyl-2-pyrrolidone (NMP) as a dispersion medium to adjust the total solid content concentration to 67%, and mixing these materials.

The obtained slurry composition for a positive electrode mixed material layer was then applied onto aluminum foil of 20 μm in thickness serving as a current collector using a comma coater such that the coating weight thereof was 20±0.5 mg/cm$^2$.

The aluminum foil was conveyed inside an oven having a temperature of 90° C. for 2 minutes and an oven having a temperature of 120° C. for 2 minutes at a speed of 200 mm/min so as to dry the slurry composition on the aluminum foil and thereby obtain a positive electrode web having a positive electrode mixed material layer formed on the current collector.

The positive electrode mixed material layer-side of the produced positive electrode web was subsequently roll pressed with a line pressure of 14 t (tons) in an environment having a temperature of 25±3° C. to obtain a positive electrode having a positive electrode mixed material layer density of 3.40 g/cm$^3$. Thereafter, the positive electrode was left in an environment having a temperature of 25±3° C. and a relative humidity of 50±5% for 1 week.

<Production of Secondary Battery>

A wound cell (discharge capacity equivalent to 520 mAh) was produced using the separator having functional layers at both sides, the negative electrode, and the positive electrode obtained as described above and was arranged inside aluminum packing. The wound cell was pressed, together with the aluminum packing, at a temperature of 70° C. and a pressure of 1.0 MPa for 8 seconds using a heated flat-plate pressing machine so as to adhere the separator and the electrodes (negative electrode and positive electrode).

The inside of the aluminum packing was then filled with an electrolyte solution. The electrolyte solution was a solution obtained by dissolving $LiPF_6$ (supporting electrolyte) with a concentration of 1 mol/L in a mixed solvent of ethylene carbonate (EC), diethyl carbonate (DEC), and vinylene carbonate (VC) (volume ratio: EC/DEC/VC=68.5/30/1.5). The aluminum packing was then closed by heat sealing at a temperature of 150° C. to tightly seal an opening of the aluminum packing, and thereby produce a lithium ion secondary battery. This lithium ion secondary battery was used to evaluate rate characteristics, cycle characteristics, storage characteristics, and reduction of residual gas content. The results are shown in Table 5.

Examples 2 and 3

A particulate polymer, a binder for a functional layer, a slurry composition for a functional layer, a separator including functional layers at both sides, a negative electrode, a positive electrode, and a secondary battery were produced in the same way as in Example 1 with the exception that the types and proportions of monomers used for shell portion formation in production of the particulate polymer were changed as shown in Table 1. The obtained particulate polymer had a core-shell structure in which the outer surface of a core portion was partially covered by a shell portion. Measurements and evaluations were conducted in the same way as in Example 1. The results are shown in Table 5.

Example 4

A particulate polymer, a binder for a functional layer, a slurry composition for a functional layer, a separator including functional layers at both sides, a negative electrode, a positive electrode, and a secondary battery were produced in the same way as in Example 1 with the exception that 1 part (in terms of solid content) of a sodium salt of carboxymethyl cellulose (produced by Daicel FineChem Ltd.; product name: D1220) was also used in production of the slurry composition for a functional layer. Measurements and evaluations were conducted in the same way as in Example 1. The results are shown in Table 5.

Example 5

A particulate polymer, a slurry composition for a functional layer, a separator including functional layers at both sides, a negative electrode, a positive electrode, and a secondary battery were produced in the same way as in Example 1 with the exception that 5 parts (in terms of solid content) of polyvinyl alcohol (produced by Kuraray Co., Ltd.; product name: PVA110), which is a water-soluble polymer, was used instead of 20 parts of the binder for a functional layer in production of the slurry composition for a functional layer. Measurements and evaluations were conducted in the same way as in Example 1. The results are shown in Table 5.

Example 6

A particulate polymer, a binder for a functional layer, a slurry composition for a functional layer, a separator including functional layers at both sides, a negative electrode, a positive electrode, and a secondary battery were produced in the same way as in Example 1 with the exception that the types and proportions of monomers used for core portion formation in production of the particulate polymer were changed as shown in Table 1. The obtained particulate polymer had a core-shell structure in which the outer surface of a core portion was partially covered by a shell portion. Measurements and evaluations were conducted in the same way as in Example 1. The results are shown in Table 5.

Example 7

A particulate polymer, a binder for a functional layer, a slurry composition for a functional layer, a separator including functional layers at both sides, a negative electrode, a positive electrode, and a secondary battery were produced in the same way as in Example 1 with the exception that the types and proportions of monomers used for core portion and shell portion formation in production of the particulate polymer were changed as shown in Table 1. The obtained particulate polymer had a core-shell structure in which the outer surface of a core portion was partially covered by a shell portion. Measurements and evaluations were conducted in the same way as in Example 1. The results are shown in Table 5.

Examples 8 and 9

A particulate polymer, a binder for a functional layer, a slurry composition for a functional layer, a separator including functional layers at both sides, a negative electrode, a positive electrode, and a secondary battery were produced in the same way as in Example 1 with the exception that the amount in terms of solid content of the binder for a functional layer used in production of the slurry composition for a functional layer was changed to 5 parts (Example 8) or 42 parts (Example 9). Measurements and evaluations were conducted in the same way as in Example 1. The results are shown in Table 5.

Example 10

A particulate polymer, a slurry composition for a functional layer, a separator including functional layers at both sides, a negative electrode, a positive electrode, and a secondary battery were produced in the same way as in Example 1 with the exception that a binder for a functional layer produced as described below was used in production of the slurry composition for a functional layer. Measurements and evaluations were conducted in the same way as in Example 1. The results are shown in Table 6.

<Production of Binder for Functional Layer>

A reactor including a stirrer was charged with 70 parts of deionized water, 0.2 parts of sodium dodecylbenzenesulfonate as an emulsifier, and 0.5 parts of ammonium persulfate, the gas phase was purged with nitrogen gas, and heating was performed to 75° C.

Meanwhile, a monomer composition was obtained in a separate vessel by mixing 50 parts of deionized water, 0.8 parts of sodium dodecylbenzenesulfonate as a dispersant, 71 parts of 2-ethylhexyl acrylate as a (meth)acrylic acid ester monomer, 25.8 parts of styrene as an aromatic monovinyl monomer, 3.0 parts of acrylic acid as an acidic group-containing monomer, and 0.2 parts of allyl methacrylate as a cross-linkable monomer. The monomer composition was continuously added into the reactor over 4 hours to perform polymerization. The reaction was carried out at 75° C. during the addition. Once this addition was completed, stirring was performed for a further 3 hours at 80° C. to complete the reaction and yield a water dispersion of a binder for a functional layer.

Example 11

A particulate polymer, a binder for a functional layer, a slurry composition for a functional layer, a separator including functional layers at both sides, a negative electrode, a positive electrode, and a secondary battery were produced in the same way as in Example 1 with the exception that a microporous membrane made of polyethylene (produced by Asahi Kasei Corporation; product name: ND412; thickness: 12 µm) was used as a separator substrate in production of the separator including functional layers at both sides (i.e., a porous membrane layer was not formed on the surface of the microporous membrane). Measurements and evaluations were conducted in the same way as in Example 1. The results are shown in Table 6.

Example 12

A particulate polymer, a binder for a functional layer, a slurry composition for a functional layer, a separator including functional layers at both sides (separator substrate not including porous membrane layer), a negative electrode, a positive electrode, and a secondary battery were produced in the same way as in Example 1 with the exception that a wetting agent was not used but 400 parts (in terms of solid content) of a ceramic slurry (produced by Zeon Corporation; product name: BM-2000M; containing alumina as non-conductive particles and a binder) was used in production of the slurry composition for a functional layer, and that a microporous membrane made of polyethylene (produced by Asahi Kasei Corporation; product name: ND412; thickness: 12 µm) was used as a separator substrate in production of the separator including functional layers at both sides (i.e., a porous membrane layer was not formed on the surface of the microporous membrane) and the thickness of the functional layers included at both sides of the separator was changed to 2.0 µm each. Measurements and evaluations were conducted in the same way as in Example 1. The results are shown in Table 6.

Example 13

A particulate polymer, a binder for a functional layer, a slurry composition for a functional layer, a separator including functional layers at both sides, a negative electrode, a positive electrode, and a secondary battery were produced in the same way as in Example 10 with the exception that the types and proportions of monomers used for core portion and shell portion formation in production of the particulate polymer were changed as shown in Table 2. The obtained particulate polymer had a core-shell structure in which the outer surface of a core portion was partially covered by a shell portion. Measurements and evaluations were conducted in the same way as in Example 1. The results are shown in Table 6.

Comparative Example 1

A particulate polymer, a binder for a functional layer, a slurry composition for a functional layer, a separator including functional layers at both sides, a negative electrode, a positive electrode, and a secondary battery were produced in the same way as in Example 1 with the exception that the types and proportions of monomers used for core portion formation in production of the particulate polymer were changed as shown in Table 2. The obtained particulate polymer had a core-shell structure in which the outer surface of a core portion was partially covered by a shell portion. Measurements and evaluations were conducted in the same way as in Example 1. The results are shown in Table 6.

Comparative Example 2

A binder for a functional layer, a slurry composition for a functional layer, a separator including functional layers at both sides, a negative electrode, a positive electrode, and a secondary battery were produced in the same way as in Example 1 with the exception that a particulate polymer not having a core-shell structure (non-core-shell structure particulate polymer) that was obtained as described below was used instead of the particulate polymer having a core-shell structure. Measurements and evaluations were conducted in the same way as in Example 1. The results are shown in Table 6.

<Production of Non-Core-Shell Structure Particulate Polymer>

A 5 MPa pressure-resistant vessel equipped with a stirrer was charged with 75.0 parts of styrene as an aromatic monovinyl monomer, 20.0 parts of n-butyl acrylate as a (meth)acrylic acid ester monomer, 1.0 parts of ethylene glycol dimethacrylate as a cross-linkable monomer, 4.0 parts of methacrylic acid as an acidic group-containing monomer, 0.3 parts of sodium dodecylbenzenesulfonate as an emulsifier, 150 parts of deionized water, and 0.3 parts of potassium persulfate as a polymerization initiator. These materials were sufficiently stirred and were then heated to 70° C. to initiate polymerization. Polymerization was continued until the polymerization conversion rate reached 96% to yield a water dispersion containing a particulate polymer. The obtained particulate polymer did not have a core-shell structure.

Comparative Examples 3 and 4

A particulate polymer, a binder for a functional layer, a slurry composition for a functional layer, a separator including functional layers at both sides, a negative electrode, a positive electrode, and a secondary battery were produced in the same way as in Example 1 with the exception that the types and proportions of monomers used for core portion and shell portion formation in production of the particulate polymer were changed as shown in Table 2. The obtained particulate polymer had a core-shell structure in which the outer surface of a core portion was partially covered by a shell portion. Measurements and evaluations were conducted in the same way as in Example 1. The results are shown in Table 6.

In Tables 1 to 6, shown below:
"ST" indicates styrene unit;
"EDMA" indicates ethylene glycol methacrylate unit;
"AMA" indicates allyl methacrylate unit;
"MAA" indicates methacrylic acid unit;
"2EHA" indicates 2-ethylhexyl acrylate unit;
"BA" indicates n-butyl acrylate unit;
"AN" indicates acrylonitrile unit;
"MMA" indicates methyl methacrylate unit;
"IA" indicates itaconic acid unit;
"BD" indicates 1,3-butadiene unit;
"HEA" indicates 2-hydroxyethyl acrylate unit;
"CMC" indicates sodium salt of carboxymethyl cellulose; and
"PVA" indicates polyvinyl alcohol.

TABLE 1

| | | | | Example 1 | Example 2 | Example 3 | Example 4 | Example 5 | Example 6 | Example 7 | Example 8 | Example 9 |
|---|---|---|---|---|---|---|---|---|---|---|---|---|
| Particulate polymer | Structure | | | Core-shell | Core-shell | Core-shell | Core-shell | Core-shell | Core-shell | Core-shell | Core-shell | Core-shell |
| | Chemical composition (core) | Aromatic monovinyl monomer unit | Type | ST | ST | ST | ST | ST | ST | ST | ST | ST |
| | | | Proportion (in overall particulate polymer) [mass %] | 37.6 | 37.6 | 37.6 | 37.6 | 37.6 | 29.6 | 37.2 | 37.6 | 37.6 |
| | | | Proportion (in core) [mass %] | 53.72 | 53.72 | 53.72 | 53.72 | 53.72 | 42.29 | 53.15 | 53.72 | 53.72 |
| | | Cross-linkable monomer unit | Type | EDMA | EDMA | EDMA | EDMA | EDMA | EDMA | AMA | EDMA | EDMA |
| | | | Proportion (in overall particulate polymer) [mass %] | 0.1 | 0.1 | 0.1 | 0.1 | 0.1 | 0.1 | 0.5 | 0.1 | 0.1 |
| | | | Proportion (in core) [mass %] | 0.14 | 0.14 | 0.14 | 0.14 | 0.14 | 0.14 | 0.71 | 0.14 | 0.14 |
| | | Acidic group-containing monomer unit | Type | MAA | MAA | MAA | MAA | MAA | MAA | MAA | MAA | MAA |
| | | | Proportion (in overall particulate polymer) [mass %] | 2.1 | 2.1 | 2.1 | 2.1 | 2.1 | 2.1 | 2.1 | 2.1 | 2.1 |
| | | | Proportion (in core) [mass %] | 3.0 | 3.0 | 3.0 | 3.0 | 3.0 | 3.0 | 3.0 | 3.0 | 3.0 |

TABLE 1-continued

|  |  |  | Example 1 | Example 2 | Example 3 | Example 4 | Example 5 | Example 6 | Example 7 | Example 8 | Example 9 |
|---|---|---|---|---|---|---|---|---|---|---|---|
|  | Other monomer units | Type | 2EHA | 2EHA | 2EHA | 2EHA | 2EHA | 2EHA | BA | 2EHA | 2EHA |
|  |  | Proportion (in overall particulate polymer) [mass %] | 23.2 | 23.2 | 23.2 | 23.2 | 23.2 | 31.2 | 23.2 | 23.2 | 23.2 |
|  |  | Proportion (in core) [mass %] | 33.14 | 33.14 | 33.14 | 33.14 | 33.14 | 44.57 | 33.14 | 33.14 | 33.14 |
|  |  | Type | AN | AN | AN | AN | AN | AN | AN | AN | AN |
|  |  | Proportion (in overall particulate polymer) [mass %] | 7 | 7 | 7 | 7 | 7 | 7 | 7 | 7 | 7 |
|  |  | Proportion (in core) [mass %] | 10 | 10 | 10 | 10 | 10 | 10 | 10 | 10 | 10 |
| Chemical composition (shell) | Aromatic monovinyl monomer unit | Type | ST | ST | ST | ST | ST | ST | ST | ST | ST |
|  |  | Proportion (in overall particulate polymer) [mass %] | 28.2 | 29.2 | 27.5 | 28.2 | 28.2 | 28.2 | 28 | 28.2 | 28.2 |
|  |  | Proportion (in shell) [mass %] | 94 | 97.3 | 91.67 | 94 | 94 | 94 | 93.33 | 94 | 94 |
|  | Acidic group-containing monomer unit | Type | MAA | MAA | IA | MAA | MAA | MAA | MAA | MAA | MAA |
|  |  | Proportion (in overall particulate polymer) [mass %] | 0.3 | 0.3 | 1 | 0.3 | 0.3 | 0.3 | 0.3 | 0.3 | 0.3 |
|  |  | Proportion (in shell) [mass %] | 1 | 1 | 3.33 | 1 | 1 | 1 | 1 | 1 | 1 |
|  | Nitrile group-containing monomer unit | Type | AN | AN | AN | AN | AN | AN | AN | AN | AN |
|  |  | Proportion (in overall particulate polymer) [mass %] | 1.5 | 0.5 | 1.5 | 1.5 | 1.5 | 1.5 | 1.7 | 1.5 | 1.5 |
|  |  | Proportion (in shell) [mass %] | 5 | 1.7 | 5 | 5 | 5 | 5 | 5.67 | 5 | 5 |

TABLE 2

|  |  |  |  | Example 10 | Example 11 | Example 12 | Example 13 | Comparative Example 1 | Comparative Example 2 | Comparative Example 3 | Comparative Example 4 |
|---|---|---|---|---|---|---|---|---|---|---|---|
| Particulate polymer | Structure |  |  | Core-shell | Core-shell | Core-shell | Core-shell | Core-shell | Non-core-shell | Core-shell | Core-shell |
|  | Chemical composition (core) | Aromatic monovinyl monomer unit | Type | ST | ST | ST | — | ST | ST: 75 EDMA: 1 MAA: 4 BA: 20 | ST | ST |
|  |  |  | Proportion (in overall particulate polymer) [mass %] | 37.6 | 37.6 | 37.6 | — | 20 |  | 39.2 | 37.6 |
|  |  |  | Proportion (in core) [mass %] | 53.72 | 53.72 | 53.72 | — | 28.57 |  | 56 | 53.72 |
|  |  | Cross-linkable monomer unit | Type | EDMA | EDMA | EDMA | AMA | EDMA |  | EDMA | EDMA |
|  |  |  | Proportion (in overall particulate polymer) [mass %] | 0.1 | 0.1 | 0.1 | 0.7 | 0.1 |  | 0.1 | 0.1 |
|  |  |  | Proportion (in core) [mass %] | 0.14 | 0.14 | 0.14 | 1 | 0.14 |  | 0.14 | 0.14 |
|  |  | Acidic group-containing monomer unit | Type | MAA | MAA | MAA | MAA | MAA |  | MAA | MAA |
|  |  |  | Proportion (in overall particulate polymer) [mass %] | 2.1 | 2.1 | 2.1 | 2.8 | 2.1 |  | 0.5 | 2.1 |
|  |  |  | Proportion (in core) [mass %] | 3.0 | 3.0 | 3.0 | 4.0 | 3.0 |  | 0.72 | 3.0 |

TABLE 2-continued

|  |  |  |  | Example 10 | Example 11 | Example 12 | Example 13 | Comparative Example 1 | Comparative Example 2 | Comparative Example 3 | Comparative Example 4 |
|---|---|---|---|---|---|---|---|---|---|---|---|
|  |  | Other monomer units | Type | 2EHA | 2EHA | 2EHA | BA | 2EHA |  | 2EHA | BA |
|  |  |  | Proportion (in overall particulate polymer) [mass %] | 23.2 | 23.2 | 23.2 | 24.5 | 40.8 |  | 23.2 | 23.2 |
|  |  |  | Proportion (in core) [mass %] | 33.14 | 33.14 | 33.14 | 35 | 58.29 |  | 33.14 | 33.14 |
|  |  |  | Type | AN | AN | AN | MMA | AN |  | AN | AN |
|  |  |  | Proportion (in overall particulate polymer) [mass %] | 7 | 7 | 7 | 42 | 7 |  | 7 | 7 |
|  |  |  | Proportion (in core) [mass %] | 10 | 10 | 10 | 60 | 10 |  | 10 | 10 |
|  | Chemical composition (shell) | Aromatic monovinyl monomer unit | Type | ST | ST | ST | ST | ST |  | ST | ST |
|  |  |  | Proportion (in overall particulate polymer) [mass %] | 28.2 | 28.2 | 28.2 | 29.1 | 28.2 |  | 29.8 | 27.3 |
|  |  |  | Proportion (in shell) [mass %] | 94 | 94 | 94 | 97 | 94 |  | 99.33 | 91 |
|  |  | Acidic group-containing monomer unit | Type | MAA | MAA | MAA | MAA | MAA |  | MAA | MAA |
|  |  |  | Proportion (in overall particulate polymer) [mass %] | 0.3 | 0.3 | 0.3 | 0.9 | 0.3 |  | 0.2 | 1.2 |
|  |  |  | Proportion (in shell) [mass %] | 1 | 1 | 1 | 3 | 1 |  | 0.67 | 4 |
|  |  | Nitrile group-containing monomer unit | Type | AN | AN | AN | — | AN |  | — | AN |
|  |  |  | Proportion (in overall particulate polymer) [mass %] | 1.5 | 1.5 | 1.5 | — | 1.5 |  | — | 1.5 |
|  |  |  | Proportion (in shell) [mass %] | 5 | 5 | 5 | — | 5 |  | — | 5 |

TABLE 3

|  |  |  |  | Example 1 | Example 2 | Example 3 | Example 4 | Example 5 | Example 6 | Example 7 | Example 8 | Example 9 |
|---|---|---|---|---|---|---|---|---|---|---|---|---|
| Binder for functional layer | Chemical composition | Aromatic monovinyl monomer unit | Type | ST | ST | ST | ST | — | ST | ST | ST | ST |
|  |  |  | Proportion [mass %] | 62.2 | 62.2 | 62.2 | 62.2 |  | 62.2 | 62.2 | 62.2 | 62.2 |
|  |  | Acidic group-containing monomer unit | Type | IA | IA | IA | IA |  | IA | IA | IA | IA |
|  |  |  | Proportion [mass %] | 3.8 | 3.8 | 3.8 | 3.8 |  | 3.8 | 3.8 | 3.8 | 3.8 |
|  |  | Other monomer units | Type | BD | BD | BD | BD |  | BD | BD | BD | BD |
|  |  |  | Proportion [mass %] | 33 | 33 | 33 | 33 |  | 33 | 33 | 33 | 33 |
|  |  |  | Type | HEA | HEA | HEA | HEA |  | HEA | HEA | HEA | HEA |
|  |  |  | Proportion [mass %] | 1 | 1 | 1 | 1 |  | 1 | 1 | 1 | 1 |

TABLE 4

|  |  |  |  | Example 10 | Example 11 | Example 12 | Example 13 | Comparative Example 1 | Comparative Example 2 | Comparative Example 3 | Comparative Example 4 |
|---|---|---|---|---|---|---|---|---|---|---|---|
| Binder for functional layer | Chemical composition | Aromatic monovinyl monomer unit | Type | ST | ST | ST | ST | ST | ST | ST | ST |
|  |  |  | Proportion [mass %] | 25.8 | 62.2 | 62.2 | 25.8 | 62.2 | 62.2 | 62.2 | 62.2 |
|  |  | Acidic group-containing monomer unit | Type | AA | IA | IA | AA | IA | IA | IA | IA |
|  |  |  | Proportion [mass %] | 3 | 3.8 | 3.8 | 3 | 3.8 | 3.8 | 3.8 | 3.8 |

TABLE 4-continued

|  |  |  | Example 10 | Example 11 | Example 12 | Example 13 | Comparative Example 1 | Comparative Example 2 | Comparative Example 3 | Comparative Example 4 |
|---|---|---|---|---|---|---|---|---|---|---|
| | Other monomer units | Type | 2EHA | BD | BD | 2EHA | BD | BD | BD | BD |
| | | Proportion [mass %] | 71 | 33 | 33 | 71 | 33 | 33 | 33 | 33 |
| | | Type | AMA | HEA | HEA | AMA | HEA | HEA | HEA | HEA |
| | | Proportion [mass %] | 0.2 | 1 | 1 | 0.2 | 1 | 1 | 1 | 1 |

TABLE 5

|  |  |  |  | Example 1 | Example 2 | Example 3 | Example 4 | Example 5 | Example 6 | Example 7 | Example 8 | Example 9 |
|---|---|---|---|---|---|---|---|---|---|---|---|---|
| Slurry composition | Particulate polymer | Structure | | Core-shell | Core-shell | Core-shell | Core-shell | Core-shell | Core-shell | Core-shell | Core-shell | Core-shell |
| | | Glass-transition temperature [° C.] | | 54 | 54 | 54 | 54 | 54 | 38 | 55 | 54 | 54 |
| | | Volume-average particle diameter [μm] | | 0.7 | 0.7 | 0.7 | 0.7 | 0.7 | 0.7 | 0.56 | 0.7 | 0.7 |
| | | Surface acid content [mmol/g] | | 0.15 | 0.09 | 0.35 | 0.15 | 0.15 | 0.15 | 0.15 | 0.15 | 0.15 |
| | | Degree of swelling in electrolyte solution [factor] | 72 hours | 2.4 | 2.4 | 2.4 | 2.4 | 2.4 | 2.4 | 2.2 | 2.4 | 2.4 |
| | | | 240 hours | 10 | 10 | 10 | 10 | 10 | 10 | 6 | 10 | 10 |
| | | Amount [parts by mass] | | 100 | 100 | 100 | 100 | 100 | 100 | 100 | 100 | 100 |
| | Binder for functional layer | Glass-transition temperature [° C.] | | 12 | 12 | 12 | 12 | — | 12 | 12 | 12 | 12 |
| | | Volume-average particle diameter [μm] | | 0.14 | 0.14 | 0.14 | 0.14 | — | 0.14 | 0.14 | 0.14 | 0.14 |
| | | Surface acid content [mmol/g] | | 0.28 | 0.28 | 0.28 | 0.28 | — | 0.28 | 0.28 | 0.28 | 0.28 |
| | | Degree of swelling in electrolyte solution [factor] | 72 hours | 1.5 | 1.5 | 1.5 | 1.5 | — | 1.5 | 1.5 | 1.5 | 1.5 |
| | | Amount [parts by mass] | | 20 | 20 | 20 | 20 | — | 20 | 20 | 5 | 42 |
| | Other components | Wetting agent | Amount [parts by mass] | 2 | 2 | 2 | 2 | 2 | 2 | 2 | 2 | 2 |
| | | Water-soluble polymer | Type | — | — | — | CMC | PVA | — | — | — | — |
| | | | Amount [parts by mass] | — | — | — | 1 | 5 | — | — | — | — |
| | | Non-conductive particles (alumina) | Amount* [parts by mass] | — | — | — | — | — | — | — | — | — |
| Presence of porous membrane layer of separator substrate | | | | Yes | Yes | Yes | Yes | Yes | Yes | Yes | Yes | Yes |
| Rate characteristics | | | | A | A | A | A | B | B | B | A | A |
| Cycle characteristics | | | | A | A | B | A | A | A | A | A | A |
| Storage characteristics | | | | A | A | A | A | A | A | C | A | A |
| Reduction of residual gas content | | | | A | B | A | A | A | A | B | A | A |
| Adhesiveness | | | | A | A | A | A | B | A | A | B | A |
| Blocking resistance | | | | A | A | A | A | A | B | A | A | B |

*Amount of all solid content in ceramic slurry containing non-conductive particles (alumina)

TABLE 6

| | | | Example 10 | Example 11 | Example 12 | Example 13 | Comparative Example 1 | Comparative Example 2 | Comparative Example 3 | Comparative Example 4 |
|---|---|---|---|---|---|---|---|---|---|---|
| Slurry composition | Particulate polyrrer | Structure | Core-shell | Core-shell | Core-shell | Core-shell | Core-shell | Non-core-shell | Core-shell | Core-shell |
| | | Glass-transition temperature ° C. | 54 | 54 | 54 | 58 | 7 | 60 | 54 | 58 |
| | | Volume-average particle diameter [μm] | 0.7 | 0.7 | 0.7 | 0.55 | 0.55 | 0.55 | 0.7 | 0.7 |
| | | Surface acid content [mmol/g] | 0.15 | 0.15 | 0.15 | 0.09 | 0.15 | 0.09 | 0.04 | 0.6 |
| | | Degree of swelling in electrolyte solution [factor] 72 hours / 240 hours | 2.4 / 10 | 2.4 / 10 | 2.4 / 10 | 3 / 4 | 2.4 / 10 | 2 / 2.5 | 2.4 / 10 | 5 / 10 |
| | | Amount [parts by mass] | 100 | 100 | 100 | 100 | 100 | 100 | 100 | 100 |
| | Binder for functional layer | Glass-transition temperature [° C.] | −30 | 12 | 12 | −30 | 12 | 12 | 12 | 12 |
| | | Volume-average particle diameter [μm] | 0.18 | 0.14 | 0.14 | 0.18 | 0.14 | 0.14 | 0.14 | 0.14 |
| | | Surface acid content [mmol/g] | 0.31 | 0.28 | 0.28 | 0.31 | 0.28 | 0.28 | 0.28 | 0.28 |
| | | Degree of swelling in electrolyte solution [factor] 72 hours | 1.7 | 1.5 | 1.5 | 1.7 | 1.5 | 1.5 | 1.5 | 1.5 |
| | | Amount [parts by mass] | 20 | 20 | 20 | 20 | 20 | 20 | 20 | 20 |
| | Other components | Wetting agent Amount [parts by mass] | 2 | 2 | — | 2 | 2 | 2 | 2 | 2 |
| | | Water-soluble polymer Type | — | — | — | — | — | — | — | — |
| | | Water-soluble polymer Amount [parts by mass] | — | — | — | — | — | — | — | — |
| | | Non-conductive particles (alumina) Amount* [parts by mass] | — | — | 400 | — | — | — | — | — |
| Presence of porous nembrane layer of separator substrate | | | Yes | No | No | Yes | Yes | Yes | Yes | Yes |
| Rate characteristics | | | A | A | B | A | C | A | A | A |
| Cycle characteristics | | | A | A | B | A | A | A | A | C |
| Storage characteristics | | | B | A | B | D | A | A | A | A |
| Reduction of residual gas content | | | A | A | A | B | B | B | C | C |
| Adhesiveness | | | A | A | B | A | A | C | A | C |
| Blocking resistance | | | A | A | A | A | C | C | A | A |

*Amount of all solid content in ceramic shrry containing non-conductive particles (alumina)

It can be seen from Tables 5 and 6 that a functional layer having excellent adhesiveness after immersion in electrolyte solution and a separator having excellent blocking resistance could be produced, and a secondary battery having excellent rate characteristics and cycle characteristics while also having less gas remaining inside thereof was obtained in Examples 1 to 13 in which the used slurry composition for a functional layer contained a particulate polymer having a core-shell structure, a glass-transition temperature of not lower than the prescribed value, and a surface acid content within the prescribed range. It can also be seen that storage characteristics of a secondary battery could be enhanced in Examples 1 to 6 and 8 to 12.

On the other hand, it can be seen from Table 6 that blocking resistance of a separator and rate characteristics of a secondary battery deteriorated in Comparative Example 1 in which the used slurry composition for a functional layer contained a particulate polymer having a glass-transition temperature of lower than the prescribed value.

It can also be seen from Table 6 that adhesiveness of a functional layer after immersion in electrolyte solution and blocking resistance of a separator decreased in Comparative Example 2 in which the used slurry composition for a functional layer contained a non-core-shell structure particulate polymer.

It can also be seen from Table 6 that the residual gas content of a secondary battery increased in Comparative Example 3 in which the used slurry composition for a functional layer contained a particulate polymer having a surface acid content falling below the lower limit of the prescribed range.

It can also be seen from Table 6 that cycle characteristics of a secondary battery deteriorated in Comparative Example 4 in which the used slurry composition for a functional layer contained a particulate polymer having a surface acid content exceeding the upper limit of the prescribed range. It can also be seen that adhesiveness of a functional layer after immersion in electrolyte solution decreased and residual gas content of a secondary battery increased in Comparative Example 4.

INDUSTRIAL APPLICABILITY

According to the present disclosure, it is possible to provide a slurry composition for a non-aqueous secondary battery functional layer with which it is possible to form a functional layer that has excellent adhesiveness after immersion in electrolyte solution and can cause a secondary battery to display excellent rate characteristics and cycle characteristics while, on the other hand, reducing the amount of gas remaining inside the secondary battery.

Moreover, according to the present disclosure, it is possible provide a separator for a non-aqueous secondary battery that can adhere well to an adjacent battery member after immersion in electrolyte solution and can cause a secondary battery to display excellent rate characteristics and cycle characteristics while, on the other hand, reducing the amount of gas remaining inside the secondary battery.

Furthermore, according to the present disclosure, it is possible to provide a non-aqueous secondary battery that has excellent rate characteristics and cycle characteristics and has less gas remaining inside thereof.

REFERENCE SIGNS LIST 100 particulate polymer.
110 core portion
110S outer surface of core portion
120 shell portion

The invention claimed is:

1. A slurry composition for a non-aqueous secondary battery functional layer comprising a particulate polymer, a binder for a functional layer and a solvent, wherein
the particulate polymer has a core-shell structure including a core portion and a shell portion at least partially covering an outer surface of the core portion,
the core portion is formed of a polymer including a nitrile group-containing monomer unit in a proportion of not less than 1 mass % and not more than 20 mass %,
the proportion constituted by an aromatic monovinyl monomer unit included in the polymer of the core portion when all repeating units included in the particulate polymer are taken to be 100 mass % is 30 mass % or more and 50 mass % or less,
the proportion constituted by the nitrile group-containing monomer unit included in the polymer of the core portion when all repeating units included in the particulate polymer are taken to be 100 mass % is 3 mass % or more and 10 mass % or less,
the particulate polymer has a glass-transition temperature of 20° C. or higher and a surface acid content of not less than 0.05 mmol/g and not more than 0.50 mmol/g, and
the amount of the binder for a functional layer per 100 parts by mass of the particulate polymer is 40 parts by mass or less.

2. The slurry composition for a non-aqueous secondary battery functional layer according to claim 1, wherein
the particulate polymer has a degree of swelling of not less than a factor of 1.0 and not more than a factor of 4.0, by mass, when immersed in an electrolyte solution for measurement for 72 hours, and
the particulate polymer has a degree of swelling of not less than a factor of 8.0 and not more than a factor of 20, by mass, when immersed in the electrolyte solution for measurement for 240 hours,
the electrolyte solution for measurement being a solution obtained by dissolving $LiPF_6$ with a concentration of 1 mol/L in a mixed solvent obtained by mixing ethylene carbonate, diethyl carbonate, and vinylene carbonate in a volume ratio of ethylene carbonate/diethyl carbonate/vinylene carbonate=68.5/30/1.5.

3. The slurry composition for a non-aqueous secondary battery functional layer according to claim 1, wherein
the core portion is formed of a polymer including an aromatic monovinyl monomer unit in a proportion of less than 85 mass %, and
the shell portion is formed of a polymer including an aromatic monovinyl monomer unit in a proportion of not less than 85 mass % and not more than 100 mass %.

4. The slurry composition for a non-aqueous secondary battery functional layer according to claim 1, wherein the binder for a functional layer has a glass-transition temperature of lower than 20° C.

5. The slurry composition for a non-aqueous secondary battery functional layer according to claim 4, wherein the binder for a functional layer is formed of a polymer including an aromatic monovinyl monomer unit.

6. A separator for a non-aqueous secondary battery comprising: a separator substrate; and a functional layer formed using the slurry composition for a non-aqueous secondary battery functional layer according to claim 1.

7. The separator for a non-aqueous secondary battery according to claim 6, wherein the separator substrate includes a porous membrane layer containing non-conductive particles and a binder.

8. A non-aqueous secondary battery comprising a positive electrode, a negative electrode, a separator, and an electrolyte solution, wherein the separator is the separator for a non-aqueous secondary battery according to claim 6.

9. A non-aqueous secondary battery comprising a positive electrode, a negative electrode, a separator, and an electrolyte solution, wherein the separator is the separator for a non-aqueous secondary battery according to claim 7.

* * * * *